(12) United States Patent
Doni et al.

(10) Patent No.: US 11,698,750 B2
(45) Date of Patent: Jul. 11, 2023

(54) SMART RE-USE OF PARITY BUFFER

(71) Applicant: SanDisk Technologies LLC, Addison, TX (US)

(72) Inventors: Bhanushankar Doni, Bangalore (IN); Pratik Bhatt, Ahmedabad (IN)

(73) Assignee: SanDisk Technologies LLC, Addison, TX (US)

( * ) Notice: Subject to any disclaimer, the term of this patent is extended or adjusted under 35 U.S.C. 154(b) by 101 days.

(21) Appl. No.: 17/492,983

(22) Filed: Oct. 4, 2021

(65) Prior Publication Data

US 2023/0112636 A1  Apr. 13, 2023

(51) Int. Cl.
*G06F 3/06*     (2006.01)
*G06F 11/10*    (2006.01)

(52) U.S. Cl.
CPC .............. *G06F 3/0656* (2013.01); *G06F 3/064* (2013.01); *G06F 3/0619* (2013.01); *G06F 3/0679* (2013.01); *G06F 11/1004* (2013.01)

(58) Field of Classification Search
CPC ....... G06F 3/0656; G06F 3/0619; G06F 3/064; G06F 3/0679; G06F 11/1004
See application file for complete search history.

(56) References Cited

U.S. PATENT DOCUMENTS

| | | | |
|---|---|---|---|
| 7,200,713 B2 | 4/2007 | Cabot et al. | |
| 7,596,643 B2 | 9/2009 | Merry, Jr. et al. | |
| 9,652,175 B2 | 5/2017 | Vanaraj et al. | |
| 10,275,310 B2 | 4/2019 | B et al. | |
| 10,459,644 B2 | 10/2019 | Mehra et al. | |
| 10,481,816 B2 | 11/2019 | Shlick et al. | |
| 10,496,472 B2 | 12/2019 | Gopalakrishnan | |
| 11,138,071 B1* | 10/2021 | Agarwal et al. | G06F 3/061 |
| 2015/0154066 A1* | 6/2015 | Grimsrud et al. | G06F 11/108 |
| | | | 714/764 |
| 2017/0075629 A1 | 3/2017 | Manohar et al. | |
| 2020/0225851 A1* | 7/2020 | Klein et al. | G06F 3/0619 |
| 2021/0081276 A1* | 3/2021 | Suzuki et al. | G06F 3/0619 |

* cited by examiner

*Primary Examiner* — Francisco A Grullon
(74) *Attorney, Agent, or Firm* — Vierra Magen Marcus LLP

(57) ABSTRACT

Technology is disclosed herein for efficient use of volatile memory that is used for accumulating parity data of user data being written to non-volatile memory cells. A memory controller may replace primary parity in a first portion of a parity buffer with data other than primary parity while a second portion of the buffer is still being used to store the primary parity. Therefore, the memory controller smartly re-uses the parity buffer, which makes efficient use of the volatile memory. In one aspect, a memory controller accumulates secondary parity for the user data in a first portion of the parity buffer while a second portion of the parity buffer is still being used to store the primary parity. The memory controller may compute the secondary parity from present content of the first portion of the parity buffer and primary parity presently stored in the second portion of the buffer.

20 Claims, 15 Drawing Sheets

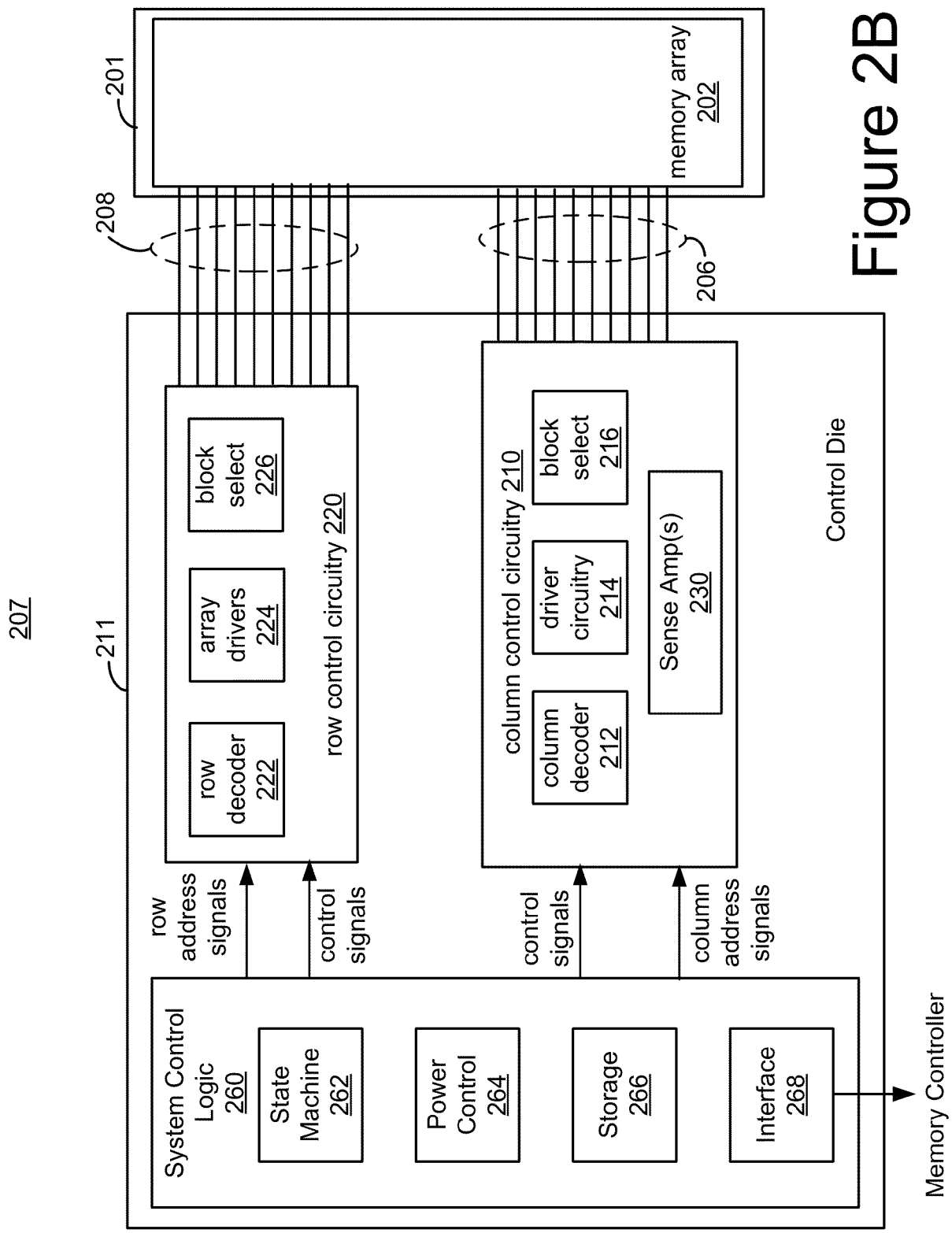

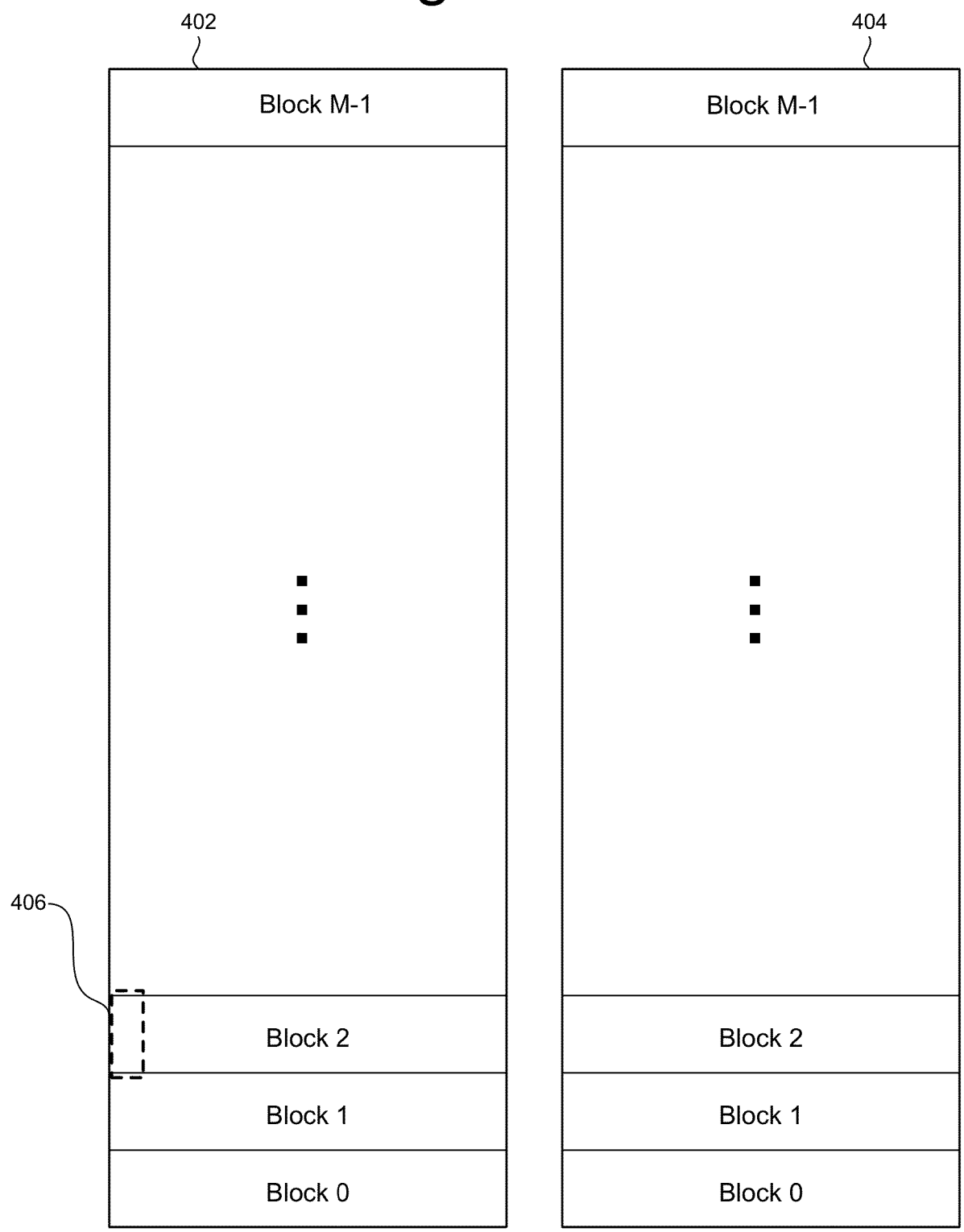

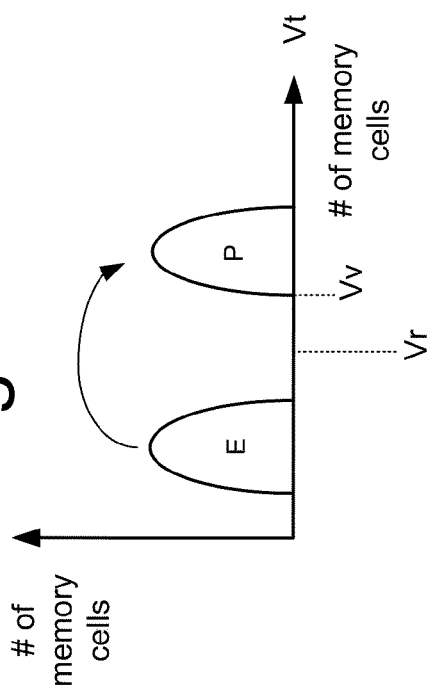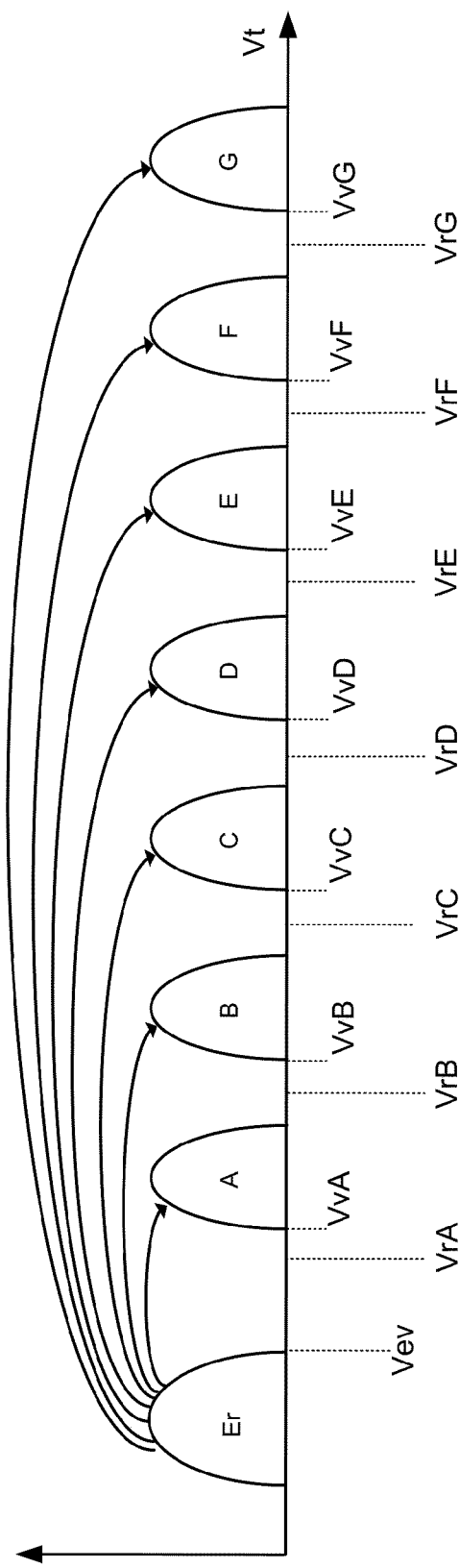

Figure 7

| WL | Sub-block | page | Memory Die 0 |   |   |   | Memory Die 1 |   |   |   | Memory Die 2 |   |   |   | Memory Die 3 |   |   |   |
|----|-----------|------|---|---|---|---|---|---|---|---|---|---|---|---|---|---|---|---|
|    |           |      | Plane 0 | Plane 1 | Plane 2 | Plane 3 | Plane 0 | Plane 1 | Plane 2 | Plane 3 | Plane 0 | Plane 1 | Plane 2 | Plane 3 | Plane 0 | Plane 1 | Plane 2 | Plane 3 |
| 0  | 0 | 0 | 0 | 0 | 0 | 0 | 0 | 0 | 0 | 0 | 0 | 0 | 0 | 0 | 0 | 0 | 0 | 0 |
| 0  | 1 | 1 | 1 | 1 | 1 | 1 | 1 | 1 | 1 | 1 | 1 | 1 | 1 | 1 | 1 | 1 | 1 | 1 |
| 0  | 2 | 2 | 2 | 2 | 2 | 2 | 2 | 2 | 2 | 2 | 2 | 2 | 2 | 2 | 2 | 2 | 2 | 2 |
| 0  | 3 | 3 | 3 | 3 | 3 | 3 | 3 | 3 | 3 | 3 | 3 | 3 | 3 | 3 | 3 | 3 | 3 | 3 |
| 0  | 4 | 4 | 4 | 4 | 4 | 4 | 4 | 4 | 4 | 4 | 4 | 4 | 4 | 4 | 4 | 4 | 4 | 4 |
| 1  | 0 | 5 | 5 | 5 | 5 | 5 | 5 | 5 | 5 | 5 | 5 | 5 | 5 | 5 | 5 | 5 | 5 | 5 |
| 1  | 1 | 6 | 6 | 6 | 6 | 6 | 6 | 6 | 6 | 6 | 6 | 6 | 6 | 6 | 6 | 6 | 6 | 6 |
| 1  | 2 | 7 | 7 | 7 | 7 | 7 | 7 | 7 | 7 | 7 | 7 | 7 | 7 | 7 | 7 | 7 | 7 | 7 |
| 1  | 3 | 8 | 8 | 8 | 8 | 8 | 8 | 8 | 8 | 8 | 8 | 8 | 8 | 8 | 8 | 8 | 8 | 8 |
| 1  | 4 | 9 | 9 | 9 | 9 | 9 | 9 | 9 | 9 | 9 | 9 | 9 | 9 | 9 | 9 | 9 | 9 | 9 |
| ... | | | | | | | | | | | | | | | | | | |
| 80 | 0 | 400 | 0 | 0 | 0 | 0 | 0 | 0 | 0 | 0 | 0 | 0 | 0 | 0 | 0 | 0 | 0 | 0 |
| 80 | 1 | 401 | 1 | 1 | 1 | 1 | 1 | 1 | 1 | 1 | 1 | 1 | 1 | 1 | 1 | 1 | 1 | 1 |
| 80 | 2 | 402 | 2 | 2 | 2 | 2 | 2 | 2 | 2 | 2 | 2 | 2 | 2 | 2 | 2 | 2 | 2 | 2 |
| 80 | 3 | 403 | 3 | 3 | 3 | 3 | 3 | 3 | 3 | 3 | 3 | 3 | 3 | 3 | 3 | 3 | 3 | 3 |
| 80 | 4 | 404 | 4 | 4 | 4 | 4 | PP0 | PP1 | PP2 | PP3 | PP4 | PP5 | PP6 | PP7 | PP8 | PP9 | SP1 | SP2 |

Figure 8

Primary Parity (810):

| | Address Location (bin) |
|---|---|
| PP0 | X — 802(0) |
| PP1 | X + (1 * page size) — 802(1) |
| PP2 | X + (2 * page size) — 802(2) |
| PP3 | X + (3 * page size) — 802(3) |
| PP4 | X + (4 * page size) — 802(4) |
| PP5 | X + (5 * page size) — 802(5) |
| PP6 | X + (6 * page size) — 802(6) |
| PP7 | X + (7 * page size) — 802(7) |
| PP8 | X + (8 * page size) — 802(8) |
| PP9 | X + (9 * page size) — 802(9) |

Secondary Parity (820):

| SP1 |
| SP2 |

(800)

SMART RE-USE OF PARITY BUFFER

BACKGROUND

The present disclosure relates to non-volatile storage.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a source of power (e.g., a battery).

Users of non-volatile memory can program (e.g., write) data to the non-volatile memory and later read that data back. For example, a digital camera may take a photograph and store the photograph in non-volatile memory. Later, a user of the digital camera may view the photograph by having the digital camera read the photograph from the non-volatile memory. Because users often rely on the data they store, it is important to users of non-volatile memory to be able to store data reliably so that it can be read back successfully.

Error correction algorithms may be used to correct errors in the stored data. An error correction code (ECC) encoder may generate parity bits based on the user data. The parity bits are stored in the non-volatile memory cells. An ECC codeword (or more briefly "codeword") that contains the user data and the parity bits is stored in the memory cells. An ECC decoder may be used to run an ECC algorithm to detect and correct errors in the data. However, there are limitations on how many errors can be corrected in an ECC codeword. Therefore, it is possible for decoding of the ECC codeword to fail.

In addition to storing the ECC codeword in the non-volatile memory system, the system may compute and store parity data. The parity data may be used to recover the user data in the event that the ECC decoder fails to decode the codeword. However, it is possible to read the user data without reading the parity data. For example, if the ECC codeword of user data is successfully decoded, then there is no need to read the parity data.

A memory controller may compute the parity data and temporarily store the parity data in volatile memory such as SRAM, DRAM, etc. Since volatile memory can have faster access times than non-volatile memory, the volatile memory is quite useful for temporary storage of parity data. However, the memory controller typically has a limited amount of volatile memory due to the cost of the volatile memory. Moreover, the memory controller may use the volatile memory for a variety of functions, such as error correction and data recovery. Therefore, the memory controller should make efficient use of its limited volatile memory.

BRIEF DESCRIPTION OF THE DRAWINGS

Like-numbered elements refer to common components in the different figures.

FIG. 2B is a block diagram of one embodiment of an integrated memory assembly.

FIG. 4A is a block diagram of one embodiment of a memory structure having two planes.

FIGS. 5A and 5B depicts threshold voltage distributions.

FIG. 7 is a table that shows locations in non-volatile memory for user data and parity for one embodiment of smart re-use of a parity buffer.

FIG. 8 is a diagram of an embodiment of parity buffer and illustrates smart re-use of the parity buffer to accumulate secondary parity.

DETAILED DESCRIPTION

Figure 1:
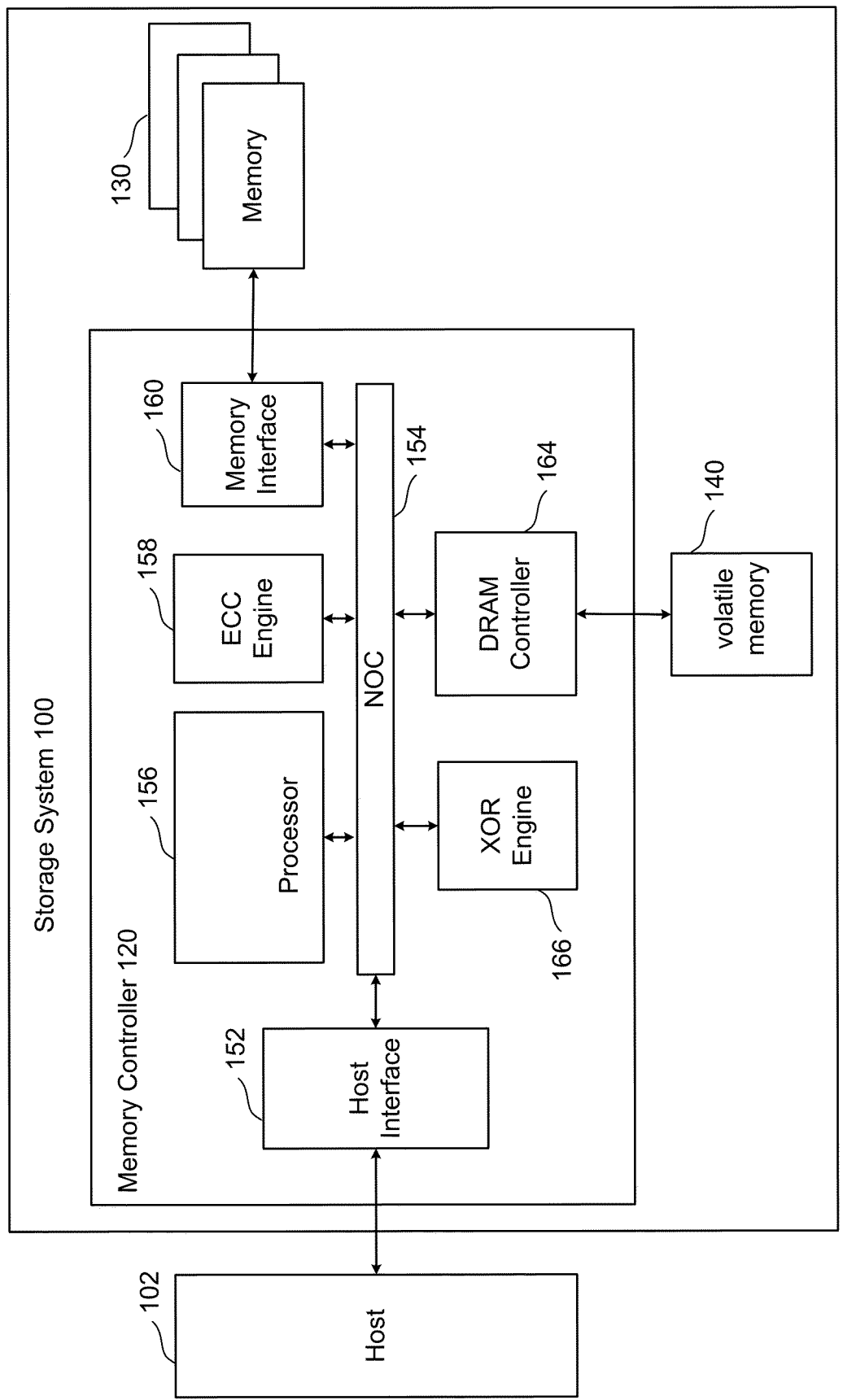
FIG. 1 is a block diagram depicting one embodiment of a storage system.

Technology is disclosed herein for efficient use of volatile memory that is used for accumulating parity of data being written to non-volatile memory cells. In some embodiments, a memory controller smartly re-uses a parity buffer. The memory controller may accumulate primary parity into a parity buffer in volatile memory (e.g., SRAM, DRAM, etc.) as the user data is being written to the non-volatile memory cells. The memory controller may replace the primary parity in a first portion of the parity buffer with data other than primary parity while a second portion of the buffer is still being used to store the primary parity. Therefore, the memory controller smartly re-uses the parity buffer, which makes efficient use of the volatile memory. This makes it possible for the memory system to have less volatile memory, which reduces cost.

In one embodiment, the memory controller accumulates secondary parity for the user data in a first portion of the parity buffer while a second portion of the parity buffer is still being used to store the primary parity. The memory controller may compute the secondary parity from present content of the first portion of the parity buffer and primary parity presently stored in the second portion of the buffer. Then, the memory controller stores the computed secondary parity into the first portion of the parity buffer. Hence, the memory controller smartly re-uses the parity buffer, which makes efficient use of the volatile memory.

The term "primary parity," as used throughout this document, refers to parity data that is used to recover user data in the event that an ECC decoder (or the like) is unable to decode an ECC codeword of the user data. The term "secondary parity," as used throughout this document, refers to parity data that is used in the event that the user data cannot be recovered by use of the primary parity data. It is possible to successfully read the user data without the primary parity or the secondary parity. For example, if the ECC decoder is able to successfully decode the ECC codeword for the user data, then there is no need for either the primary parity or the secondary parity. In some embodiments, the primary parity and the secondary parity are generated based on successive bitwise exclusive OR (XOR) operations. However, the primary parity and the secondary parity could be generated based on techniques other than successive bitwise XOR operations. The term "parity data" may be used herein to refer to either primary parity or secondary parity. The term "parity data" may be used herein to differentiate from "parity bits" that are based on the user data and are used to decode the user data.

The terms "buffer", "parity buffer", "memory buffer" or the like, as used throughout this document, mean a portion of volatile memory that is used to temporarily store data prior to transfer of the data to another location. For example, a parity buffer is used to temporarily store parity data prior to storing the parity data in non-volatile memory cells.

The use of primary parity and secondary parity can be especially useful in memory systems which are unusually susceptible to errors in the stored data, such that decoding an ECC codeword has a relatively high chance of failure. The use of primary parity and secondary parity allows the use of memory dies that have defects that could lead to errors in the stored data. Therefore, memory dies that might otherwise be discarded may be used. However, embodiments of smartly re-using a parity buffer are not limited to such memory systems which are unusually susceptible to errors in the stored data.

In one embodiment, the memory controller replaces the primary parity in a first portion of the parity buffer with recovery data for exception handling while a second portion of the buffer is still being used to store the primary parity. For example, the memory controller may save primary parity from the parity buffer to a first memory die. Then, the memory controller transfers the recovery data from a second memory die to the parity buffer. After resetting the second memory die, the memory controller transfers the recovery data from the parity buffer to the second memory die. Then, the memory controller transfers the primary parity from the first memory die back to the parity buffer. Therefore, the memory controller smartly re-uses the parity buffer, which makes efficient use of the volatile memory.

In some embodiments, the memory controller programs the primary parity and the secondary parity into non-volatile storage cells in parallel, which saves programming time. For example, the memory controller may transfer the primary parity from the parity buffer to latches on a first set of one or more memory die. The memory controller transfers the secondary parity from the parity buffer to latches on a second set of one or more memory die. The primary parity and the secondary parity are then programmed in parallel on the first and second sets of memory die. Therefore, the programming time is reduced relative to programming the primary parity and the secondary parity at different times.

FIG. 1 is a block diagram of one embodiment of a storage system 100 that implements the technology described herein. In one embodiment, storage system 100 is a solid state drive ("SSD"). Storage system 100 can also be a memory card, USB drive or other type of storage system. The proposed technology is not limited to any one type of memory system. Storage system 100 is connected to host 102, which can be a computer, server, electronic device (e.g., smart phone, tablet or other mobile device), appliance, or another apparatus that uses memory and has data processing capabilities. In some embodiments, host 102 is separate from, but connected to, storage system 100. In other embodiments, storage system 100 is embedded within host 102.

The components of storage system 100 depicted in FIG. 1 are electrical circuits. Storage system 100 includes a memory controller 120 connected to non-volatile memory 130 and local high speed volatile memory 140 (e.g., DRAM, SRAM). Local high speed volatile memory 140 is used by memory controller 120 to perform certain operations. For example, local high speed volatile memory 140 may store logical to physical address translation tables ("L2P tables"). A portion of local high speed volatile memory 140 may also be used as a parity buffer. For example, the memory controller may calculate parity data as user data is being programmed to the memory 130. The parity data may be temporarily stored in the local high speed volatile memory 140 prior to writing the parity data to the memory 130. Technology is disclosed herein for efficiently using the local high speed volatile memory 140. In an embodiment, the memory controller 120 smartly re-uses a parity buffer in the local high speed volatile memory 140, which efficiently uses the memory 140.

Memory controller 120 comprises a host interface 152 that is connected to and in communication with host 102. In one embodiment, host interface 152 implements a NVM Express (NVMe) over PCI Express (PCIe). Other interfaces can also be used, such as SCSI, SATA, etc. Host interface 152 is also connected to a network-on-chip (NOC) 154. A NOC is a communication subsystem on an integrated circuit. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 154 can be replaced by a bus. Connected to and in communication with NOC 154 is processor 156, ECC engine 158, memory interface 160, and DRAM controller 164. DRAM controller 164 is used to operate and communicate with local high speed volatile memory 140 (e.g., DRAM). In other embodiments, local high speed volatile memory 140 can be SRAM or another type of volatile memory.

ECC engine 158 performs error correction services. For example, ECC engine 158 performs data encoding and decoding. In one embodiment, ECC engine 158 is an electrical circuit programmed by software. For example, ECC engine 158 can be a processor that can be programmed. In other embodiments, ECC engine 158 is a custom and dedicated hardware circuit without any software. In another embodiment, the function of ECC engine 158 is implemented by processor 156.

XOR engine 166 computes parity data for data that is written to memory 130. The parity data may be temporarily stored in a parity buffer in local memory 140. In some embodiments, the parity data is repeatedly updated based on the latest data that is written to memory 130, which is referred to herein as accumulating parity data. In some embodiments, the XOR engine 166 accumulates XOR data by successively performing bitwise XOR operations on the data that is presently written to the memory 130 and present parity data in the local memory 140. The present parity data in the local memory 140 contains results of previous XOR operations. In other words, the XOR engine 166 may perform an XOR between data being transferred to memory 130 and the contents of some portion of the parity buffer, and then store the result back into that portion of the parity buffer. Therefore, the parity data in the local memory 140 may be updated as user data is being written to the memory 130. In some embodiments, the processor 156 provides the XOR engine 166 with addresses in the volatile memory 140. These addresses inform the XOR engine 166 of the locations in volatile memory 140 should be accessed to form the bitwise XOR, as well as where to store the result in volatile memory 140.

In one embodiment, XOR engine 166 is a custom and dedicated hardware circuit. In some embodiments, the XOR engine 166 is an electrical circuit programmed by software. For example, XOR engine 166 can be a processor that can be programmed. In one embodiment, the function of XOR engine 166 is implemented by processor 156. In some embodiments, the XOR engine comprises multiple engines, which are able to independently perform XOR operations.

Processor 156 performs the various controller memory operations, such as programming, erasing, reading, and memory management processes. In one embodiment, processor 156 is programmed by firmware. In other embodiments, processor 156 is a custom and dedicated hardware circuit without any software. Processor 156 also implements a translation module, as a software/firmware process or as a dedicated hardware circuit. In many systems, the non-volatile memory is addressed internally to the storage system using physical addresses associated with the one or more memory die. However, the host system will use logical addresses to address the various memory locations. This enables the host to assign data to consecutive logical addresses, while the storage system is free to store the data as it wishes among the locations of the one or more memory die. To implement this system, memory controller 120 (e.g., the translation module) performs address translation between the logical addresses used by the host and the physical addresses used by the memory dies. One example implementation is to maintain tables (i.e. the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 140 cannot hold all of the L2P tables. In such a case, the entire set of L2P tables are stored in a memory 130 and a subset of the L2P tables are cached (L2P cache) in the local high speed volatile memory 140.

Memory interface 160 communicates with non-volatile memory 130. In one embodiment, memory interface provides a Toggle Mode interface. Other interfaces can also be used. In some example implementations, memory interface 160 (or another portion of controller 120) implements a scheduler and buffer for transmitting data to and receiving data from one or more memory die.

Figure 2A:
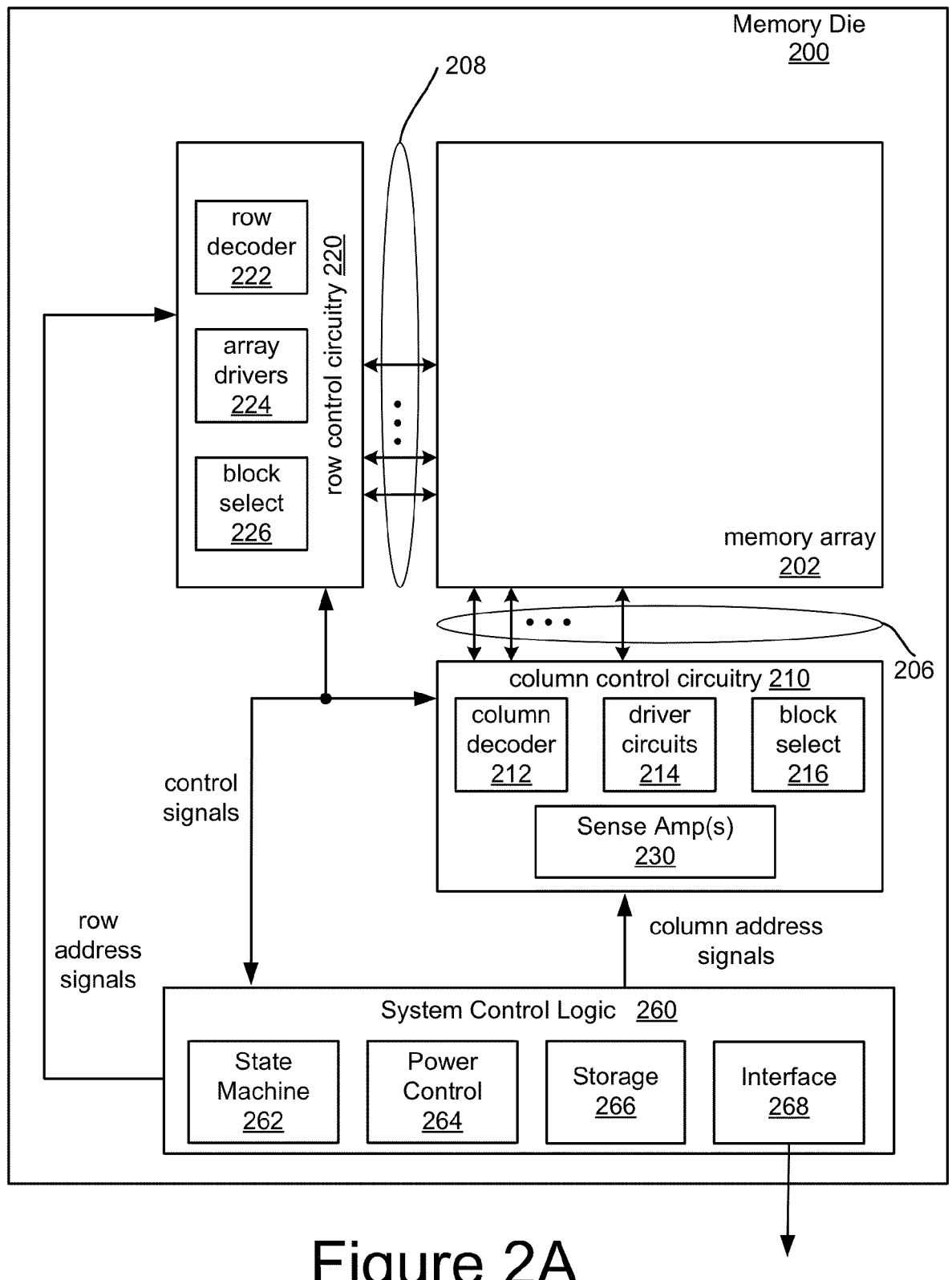
FIG. 2A is a block diagram of one embodiment of a memory die.

In one embodiment, non-volatile memory 130 comprises one or more memory die. FIG. 2A is a functional block diagram of one embodiment of a memory die 200 that comprises non-volatile memory 130. Each of the one or more memory die of non-volatile memory 130 can be implemented as memory die 200 of FIG. 2A. The components depicted in FIG. 2A are electrical circuits. Memory die 200 includes a memory array 202 that can comprise non-volatile memory cells, as described in more detail below. The array terminal lines of memory array 202 include the various layer(s) of word lines organized as rows, and the various layer(s) of bit lines organized as columns. However, other orientations can also be implemented. Memory die 200 includes row control circuitry 220, whose outputs 208 are connected to respective word lines of the memory array 202. Row control circuitry 220 receives a group of M row address signals and one or more various control signals from System Control Logic circuit 260, and typically may include such circuits as row decoders 222, array drivers 224, and block select circuitry 226 for both reading and writing (programming) operations. Row control circuitry 220 may also include read/write circuitry. Memory die 200 also includes column control circuitry 210 including sense amplifier(s) 230 whose input/outputs 206 are connected to respective bit lines of the memory array 202. Although only single block is shown for array 202, a memory die can include multiple arrays that can be individually accessed. Column control circuitry 210 receives a group of N column address signals and one or more various control signals from System Control Logic 260, and typically may include such circuits as column decoders 212, array terminal receivers or driver circuits 214, block select circuitry 216, as well as read/write circuitry, and I/O multiplexers.

System control logic 260 receives data and commands from memory controller 120 and provides output data and status to the host. In some embodiments, the system control logic 260 (which comprises one or more electrical circuits) include state machine 262 that provides die-level control of memory operations. In one embodiment, the state machine 262 is programmable by software. In other embodiments, the state machine 262 does not use software and is completely implemented in hardware (e.g., electrical circuits). In another embodiment, the state machine 262 is replaced by a micro-controller or microprocessor, either on or off the memory chip. System control logic 260 can also include a power control module 264 that controls the power and voltages supplied to the rows and columns of the memory structure 202 during memory operations and may include charge pumps and regulator circuit for creating regulating voltages. System control logic 260 includes storage 266 (e.g., RAM, registers, latches, etc.), which may be used to store parameters for operating the memory array 202.

Commands and data are transferred between memory controller 120 and memory die 200 via memory controller interface 268 (also referred to as a "communication interface"). Memory controller interface 268 is an electrical interface for communicating with memory controller 120. Examples of memory controller interface 268 include a Toggle Mode Interface and an Open NAND Flash Interface (ONFI). Other I/O interfaces can also be used.

In some embodiments, all the elements of memory die 200, including the system control logic 260, can be formed as part of a single die. In other embodiments, some or all of the system control logic 260 can be formed on a different die.

In one embodiment, memory structure 202 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping layers.

In another embodiment, memory structure 202 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 202 is not limited to the examples above. Many different types of memory array architectures or memory technologies can be used to form memory structure 202. No particular non-volatile memory technology is required for purposes of the new claimed embodiments proposed herein. Other examples of suitable technologies for memory cells of the memory structure 202 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 202 include two dimensional arrays, three dimensional arrays, cross-point arrays, stacked two dimensional arrays, vertical bit line arrays, and the like.

One example of a ReRAM cross-point memory includes reversible resistanceswitching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe - Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2A can be grouped into two parts: (1) memory structure 202 and (2) peripheral circuitry, which includes all of the other components depicted in FIG. 2A. An important characteristic of a memory circuit is its capacity, which can be increased by increasing the area of the memory die of storage system 100 that is given over to the memory structure 202; however, this reduces the area of the memory die available for the peripheral circuitry. This can place quite severe restrictions on these elements of the peripheral circuitry. For example, the need to fit sense amplifier circuits within the available area can be a significant restriction on sense amplifier design architectures. With respect to the system control logic 260, reduced availability of area can limit the available functionalities that can be implemented on-chip. Consequently, a basic trade-off in the design of a memory die for the storage system 100 is the amount of area to devote to the memory structure 202 and the amount of area to devote to the peripheral circuitry.

Another area in which the memory structure 202 and the peripheral circuitry are often at odds is in the processing involved in forming these regions, since these regions often involve differing processing technologies and the trade-off in having differing technologies on a single die. For example, when the memory structure 202 is NAND flash, this is an NMOS structure, while the peripheral circuitry is often CMOS based. For example, elements such sense amplifier circuits, charge pumps, logic elements in a state machine, and other peripheral circuitry in system control logic 260 often employ PMOS devices. Processing operations for manufacturing a CMOS die will differ in many aspects from the processing operations optimized for an NMOS flash NAND memory or other memory cell technologies.

To improve upon these limitations, embodiments described below can separate the elements of FIG. 2A onto separately formed dies that are then bonded together. More specifically, the memory structure 202 can be formed on one die (referred to as the memory die) and some or all of the peripheral circuitry elements, including one or more control circuits, can be formed on a separate die (referred to as the control die). For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate control die. This allows each of the memory die to be optimized individually according to its technology. For example, a NAND memory die can be optimized for an NMOS based memory array structure, without worrying about the CMOS elements that have now been moved onto a control die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other die. Although the following will focus on a bonded memory circuit of one memory die and one control die, other embodiments can use more die, such as two memory die and one control die, for example.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 207. One or more integrated memory assemblies 207 may be used to implement the non-volatile memory 130 of storage system 100. The integrated memory assembly 207 includes two types of semiconductor die (or more succinctly, "die"). Memory structure die 201 includes memory structure 202. Memory structure 202 includes non-volatile memory cells. Control die 211 includes control circuitry 260, 210, and 220 (as described above). In some embodiments, control die 211 is configured to connect to the memory structure 202 in the memory structure die 201. In some embodiments, the memory structure die 201 and the control die 211 are bonded together.

FIG. 2B shows an example of the peripheral circuitry, including control circuits, formed in a peripheral circuit or control die 211 coupled to memory structure 202 formed in memory structure die 201. Common components are labelled similarly to FIG. 2A. System control logic 260, row control circuitry 220, and column control circuitry 210 are located in control die 211. In some embodiments, all or a portion of the column control circuitry 210 and all or a portion of the row control circuitry 220 are located on the memory structure die 201. In some embodiments, some of the circuitry in the system control logic 260 is located on the on the memory structure die 201.

System control logic 260, row control circuitry 220, and column control circuitry 210 may be formed by a common process (e.g., CMOS process), so that adding elements and functionalities, such as ECC, more typically found on a memory controller 120 may require few or no additional process steps (i.e., the same process steps used to fabricate controller 120 may also be used to fabricate system control logic 260, row control circuitry 220, and column control circuitry 210). Thus, while moving such circuits from a die such as memory 2 die 201 may reduce the number of steps needed to fabricate such a die, adding such circuits to a die such as control die 211 may not require many additional process steps. The control die 211 could also be referred to as a CMOS die, due to the use of CMOS technology to implement some or all of control circuitry 260, 210, 220.

FIG. 2B shows column control circuitry 210 including sense amplifier(s) 230 on the control die 211 coupled to memory structure 202 on the memory structure die 201 through electrical paths 206. For example, electrical paths 206 may provide electrical connection between column decoder 212, driver circuitry 214, and block select 216 and bit lines of memory structure 202. Electrical paths may extend from column control circuitry 210 in control die 211 through pads on control die 211 that are bonded to corresponding pads of the memory structure die 201, which are connected to bit lines of memory structure 202. Each bit line of memory structure 202 may have a corresponding electrical path in electrical paths 206, including a pair of bond pads, which connects to column control circuitry 210. Similarly, row control circuitry 220, including row decoder 222, array drivers 224, and block select 226 are coupled to memory structure 202 through electrical paths 208. Each of electrical path 208 may correspond to a word line, dummy word line, or select gate line. Additional electrical paths may also be provided between control die 211 and memory structure die 201.

For purposes of this document, the phrases "a control circuit" or "one or more control circuits" can include any one of or any combination of memory controller 120, state machine 262, power control 264, all or a portion of system control logic 260, all or a portion of row control circuitry 220, all or a portion of column control circuitry 210, sense amps 230, a microcontroller, a microprocessor, and/or other similar functioned circuits. The control circuit can include hardware only or a combination of hardware and software (including firmware). For example, a controller programmed by firmware to perform the functions described herein is one example of a control circuit. A control circuit can include a processor, FPGA, ASIC, integrated circuit, or other type of circuit.

Figure 2C:
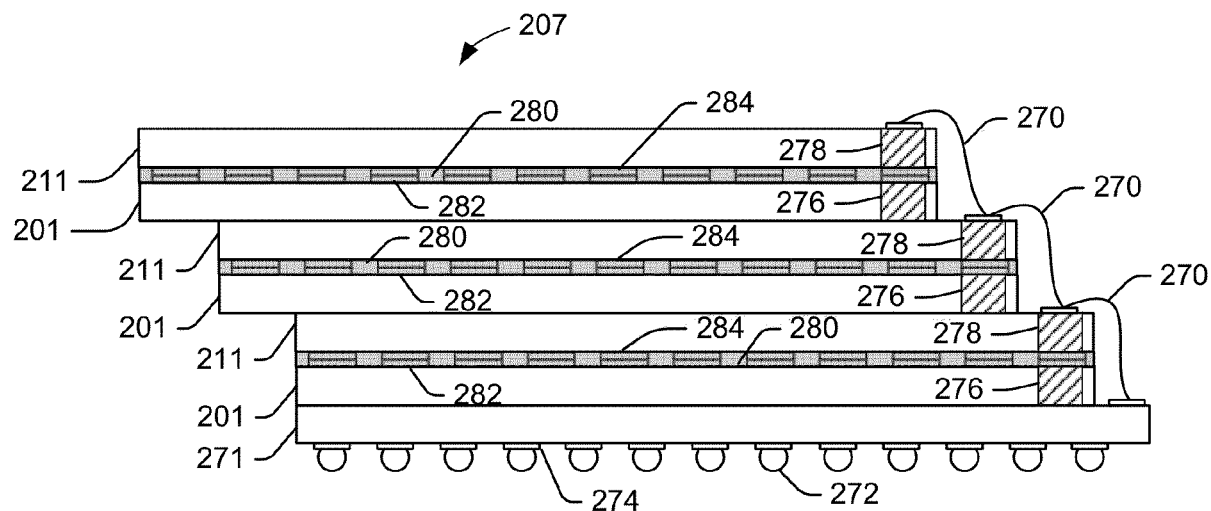
FIGS. 2C and 2D depict different embodiments of integrated memory assemblies.

In some embodiments, there is more than one control die 211 and more than one memory structure die 201 in an integrated memory assembly 207. In some embodiments, the integrated memory assembly 207 includes a stack of multiple control die 211 and multiple memory structure die 201. FIG. 2C depicts a side view of an embodiment of an integrated memory assembly 207 stacked on a substrate 271 (e.g., a stack comprising control dies 211 and memory dies 201). The integrated memory assembly 207 has three control dies 211 and three memory dies 201. In some embodiments, there are more than three memory dies 201 and more than three control die 211.

Each control die 211 is affixed (e.g., bonded) to at least one of the memory dies 201. Some of the bond pads 282/284 are depicted. There may be many more bond pads. A space between two dies 201, 211 that are bonded together is filled with a solid layer 280, which may be formed from epoxy or other resin or polymer. This solid layer 280 protects the electrical connections between the dies 201, 211, and further secures the dies together. Various materials may be used as solid layer 280, but in embodiments, it may be Hysol epoxy resin from Henkel Corp., having offices in California, USA.

The integrated memory assembly 207 may for example be stacked with a stepped offset, leaving the bond pads at each level uncovered and accessible from above. Wire bonds 270 connected to the bond pads connect the control die 211 to the substrate 271. A number of such wire bonds may be formed across the width of each control die 211 (i.e., into the page of FIG. 2C).

A memory die through silicon via (TSV) 276 may be used to route signals through a memory structure die 201. A control die through silicon via (TSV) 278 may be used to route signals through a control die 211. The TSVs 276, 278 may be formed before, during or after formation of the integrated circuits in the semiconductor dies 201, 211. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package. The solder balls 272 may form a part of the interface between integrated memory assembly 207 and memory controller 120.

Figure 2D:
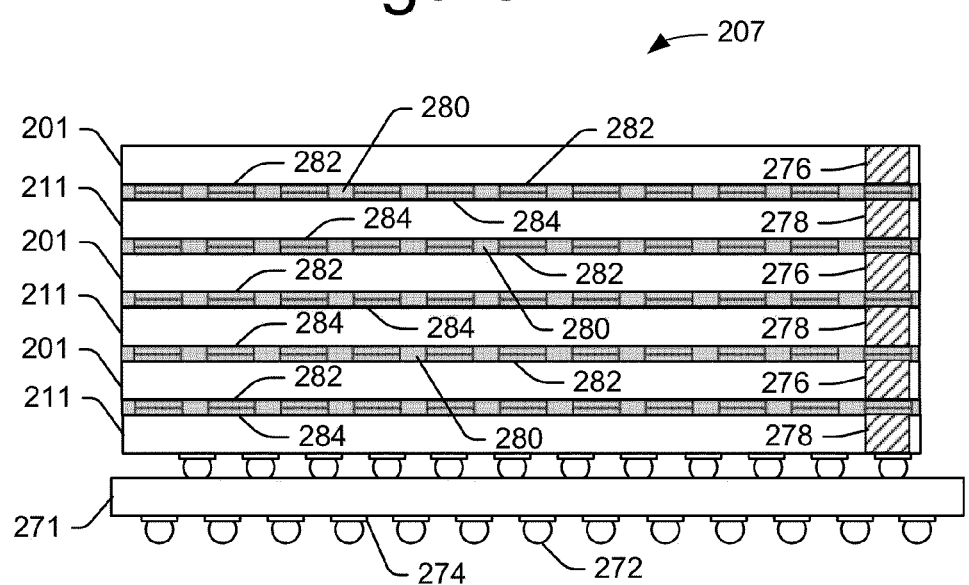

FIG. 2D depicts a side view of another embodiment of an integrated memory assembly 207 stacked on a substrate 271. The integrated memory assembly 207 of FIG. 2D has three control die 211 and three memory structure die 201. In some embodiments, there are many more than three memory dies 201 and many more than three control dies 211. In this example, each control die 211 is bonded to at least one memory structure die 201. Optionally, a control die 211 may be bonded to two or more memory structure die 201.

Some of the bond pads 282, 284 are depicted. There may be many more bond pads. A space between two dies 201, 211 that are bonded together is filled with a solid layer 280, which may be formed from epoxy or other resin or polymer. In contrast to the example in FIG. 2C, the integrated memory assembly 207 in FIG. 2D does not have a stepped offset. A memory die through silicon via (TSV) 276 may be used to route signals through a memory structure die 201. A control die through silicon via (TSV) 278 may be used to route signals through a control die 211.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package.

As has been briefly discussed above, the control die 211 and the memory structure die 201 may be bonded together. Bond pads on each die 201, 211 may be used to bond the two dies together. In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat may also be applied. In embodiments using Cu-to-Cu bonding, the bond pads may be about 5 μm square and spaced from each other with a pitch of 5 μm to 5 μm. While this process is referred to herein as Cu-to-Cu bonding, this term may also apply even where the bond pads are formed of materials other than Cu.

When the area of bond pads is small, it may be difficult to bond the semiconductor dies together. The size of, and pitch between, bond pads may be further reduced by providing a film layer on the surfaces of the semiconductor dies including the bond pads. The film layer is provided around the bond pads. When the dies are brought together, the bond pads may bond to each other, and the film layers on the respective dies may bond to each other. Such a bonding technique may be referred to as hybrid bonding. In embodiments using hybrid bonding, the bond pads may be about 5 μm square and spaced from each other with a pitch of 1 μm to 5 μm. Bonding techniques may be used providing bond pads with even smaller sizes and pitches.

Some embodiments may include a film on surface of the dies 201, 211. Where no such film is initially provided, a space between the dies may be under filled with an epoxy or other resin or polymer. The under-fill material may be applied as a liquid which then hardens into a solid layer. This under-fill step protects the electrical connections between the dies 201, 211, and further secures the dies together. Various materials may be used as under-fill material, but in embodiments, it may be Hysol epoxy resin from Henkel Corp., having offices in California, USA.

Figure 3:
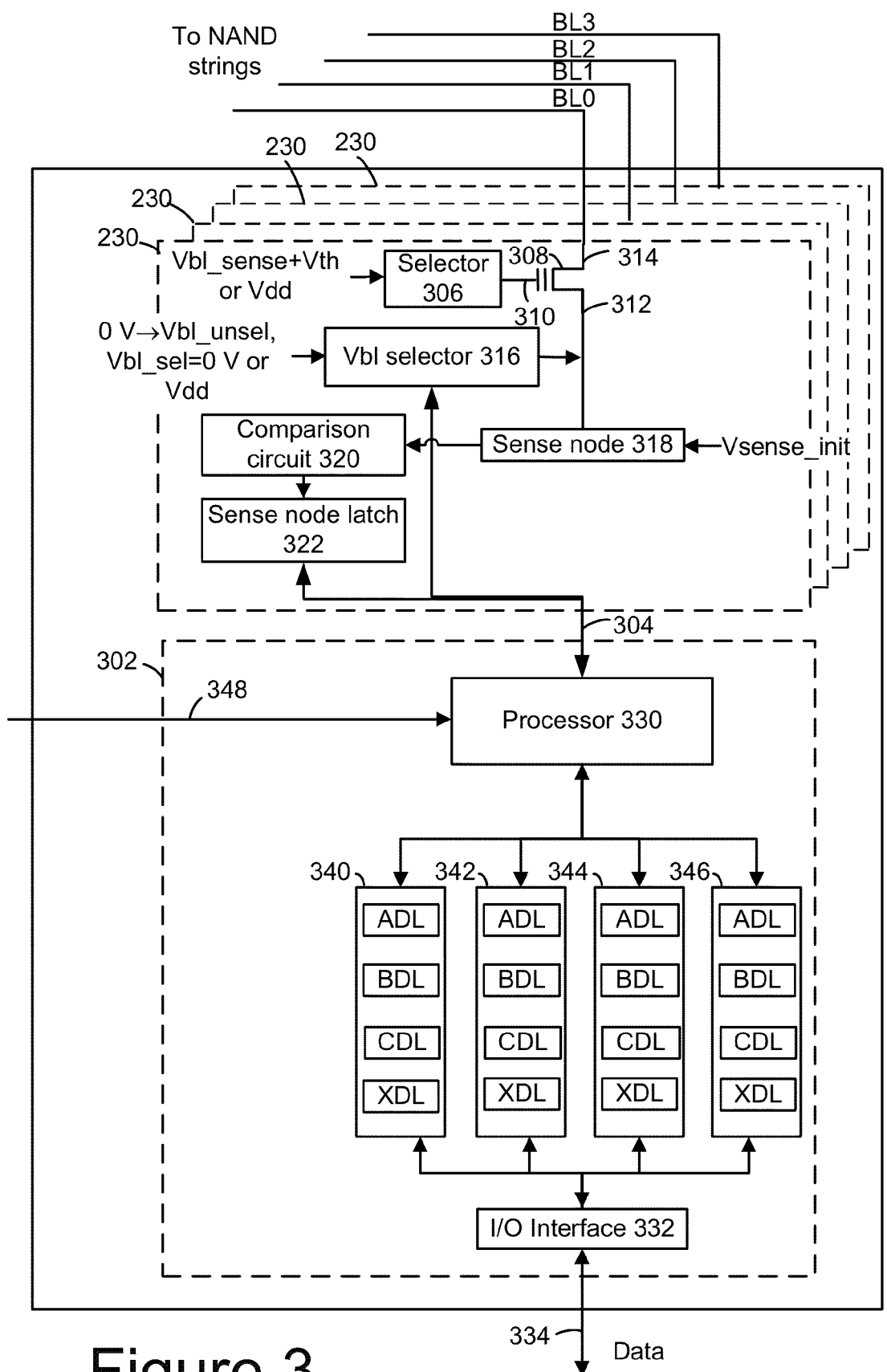
FIG. 3 depicts circuitry used to sense data from non-volatile memory.

FIG. 3 is a block diagram depicting one embodiment of a portion of column control circuitry 210 that is partitioned into a plurality of sense amplifiers 230, and a common portion, referred to as a managing circuit 302. In one embodiment, each sense amplifier 230 is connected to a respective bit line which in turn is connected to one or more NAND strings. Managing circuit 302 is connected to a set of multiple (e.g., four, eight, etc.) sense amplifiers 230. Each of the sense amplifiers 230 in a group communicates with the associated managing circuit via data bus 304.

Each sense amplifier 230 operates to provide voltages to bit lines (see BL0, BL1. BL2. BL3) during program, verify, erase and read operations. Sense amplifiers are also used to sense the condition (e.g., data state) to a memory cells in a NAND string connected to the bit line that connects to the respective sense amplifier.

Each sense amplifier 230 includes a selector 306 or switch connected to a transistor 308 (e.g., an nMOS). Based on voltages at the control gate 310 and drain 312 of the transistor 308, the transistor can operate as a pass gate or as a bit line clamp. When the voltage at the control gate is sufficiently higher than the voltage on the drain, the transistor operates as a pass gate to pass the voltage at the drain to the bit line (BL) at the source 314 of the transistor. For example, a program-inhibit voltage such as 1-2 V may be passed when pre-charging and inhibiting an unselected NAND string. Or, a program-enable voltage such as 0 V may be passed to allow programming in a selected NAND string. The selector 306 may pass a power supply voltage Vdd, (e.g., 3-4 V) to the control gate of the transistor 308 to cause it to operate as a pass gate.

When the voltage at the control gate is lower than the voltage on the drain, the transistor 308 operates as a source-follower to set or clamp the bit line voltage at Vcg-Vth, where Vcg is the voltage on the control gate 310 and Vth, e.g., 0.7 V, is the threshold voltage of the transistor 308. This assumes the source line is at 0 V. If Vcelsrc is non-zero, the bit line voltage is clamped at Vcg-Vcelsrc-Vth. The transistor is therefore sometimes referred to as a bit line clamp (BLC) transistor, and the voltage Vcg on the control gate 310 is referred to as a bit line clamp voltage, Vblc. This mode can be used during sensing operations such as read and verify operations. The bit line voltage is thus set by the transistor 308 based on the voltage output by the selector 306. For example, the selector 306 may pass Vsense+Vth, e.g., 1.5 V, to the control gate of the transistor 308 to provide Vsense, e.g., 0.8 V, on the bit line. A Vbl selector 316 may pass a relatively high voltage such as Vdd to the drain 312, which is higher than the control gate voltage on the transistor 308, to provide the source-follower mode during sensing operations. Vbl refers to the bit line voltage.

The Vbl selector 316 can pass one of a number of voltage signals. For example, the Vbl selector can pass a program-inhibit voltage signal which increases from an initial voltage, e.g., 0 V, to a program inhibit voltage, e.g., Vbl_inh for respective bit lines of unselected NAND string during a program loop. The Vbl selector 316 can pass a program-enable voltage signal such as 0 V for respective bit lines of selected NAND strings during a program loop.

In one approach, the selector 306 of each sense circuit can be controlled separately from the selectors of other sense circuits. The Vbl selector 316 of each sense circuit can also be controlled separately from the Vbl selectors of other sense circuits.

During sensing, a sense node 318 is charged up to an initial voltage, Vsense_init, such as 3 V. The sense node is then passed to the bit line via the transistor 308, and an amount of decay of the sense node is used to determine whether a memory cell is in a conductive or non-conductive state. The amount of decay of the sense node also indicates whether a current Icell in the memory cell exceeds a reference current, Iref. A larger decay corresponds to a larger current. If Icell<=Iref, the memory cell is in a non-conductive state and if Icell>Iref, the memory cell is in a conductive state.

In particular, the comparison circuit 320 determines the amount of decay by comparing the sense node voltage to a trip voltage at a sense time. If the sense node voltage decays below the trip voltage, Vtrip, the memory cell is in a conductive state and its Vth is at or below the verify voltage. If the sense node voltage does not decay below Vtrip, the memory cell is in a non-conductive state and its Vth is above the verify voltage. A sense node latch 322 is set to 0 or 1, for example, by the comparison circuit 320 based on whether the memory cell is in a conductive or non-conductive state, respectively. For example, in a program-verify test, a 0 can denote fail and a 1 can denote pass. The bit in the sense node latch can be read out in a state bit scan operation of a scan operation or flipped from 0 to 1 in a fill operation. The bit in the sense node latch 322 can also be used in a lockout scan to decide whether to set a bit line voltage to an inhibit or a program enable level in a next program loop. L Managing circuit 302 comprises a processor 330, four example sets of data latches 340, 342, 344 and 346, and an I/O interface 332 coupled between the sets of data latches and the data bus 334. FIG. 3 shows four example sets of data latches 340, 342, 344 and 346; however, in other embodiments more or fewer than four can be implemented. In one embodiment, there is one set of latches for each sense amplifier 230. One set of three data latches, e.g., comprising individual latches ADL, BDL, CDL and XDL, can be provided for each sense circuit. In some cases, a different number of data latches may be used. In a three bit per memory cell embodiment, ADL stores a bit for a lower page of data, BDL stores a bit for a middle page of data, CDL stores a bit for an upper page of data and XDL serves as an interface latch for storing/latching data from the memory controller.

Processor 330 performs computations, such as to determine the data stored in the sensed memory cell and store the determined data in the set of data latches. Each set of data latches 340-346 is used to store data bits determined by processor 330 during a read operation, and to store data bits imported from the data bus 334 during a program operation which represent write data meant to be programmed into the memory. I/O interface 332 provides an interface between data latches 340-346 and the data bus 334.

During reading, the operation of the system is under the control of state machine 262 that controls the supply of different control gate voltages to the addressed memory cell. As it steps through the various predefined control gate voltages corresponding to the various memory states supported by the memory, the sense circuit may trip at one of these voltages and a corresponding output will be provided from the sense amplifier to processor 330 via the data bus 304. At that point, processor 330 determines the resultant memory state by consideration of the tripping event(s) of the sense circuit and the information about the applied control gate voltage from the state machine via input lines 348. It then computes a binary encoding for the memory state and stores the resultant data bits into data latches 340-346.

Some implementations can include multiple processors 330. In one embodiment, each processor 330 will include an output line (not depicted) such that each of the output lines is connected in a wired-OR connection. A wired OR connection or line can be provided by connecting multiple wires together at a node, where each wire carries a high or low input signal from a respective processor, and an output of the node is high if any of the input signals is high. In some embodiments, the output lines are inverted prior to being connected to the wired-OR line. This configuration enables a quick determination during a program verify test of when the programming process has completed because the state machine receiving the wired-OR can determine when all bits being programmed have reached the desired level. For example, when each bit has reached its desired level, a logic zero for that bit will be sent to the wired-OR line (or a data one is inverted). When all bits output a data 0 (or a data one inverted), then the state machine knows to terminate the programming process. Because each processor communicates with eight sense circuits, the state machine needs to read the wired-OR line eight times, or logic is added to processor 330 to accumulate the results of the associated bit lines such that the state machine need only read the wired-OR line one time. Similarly, by choosing the logic levels correctly, the global state machine can detect when the first bit changes its state and change the algorithms accordingly.

During program or verify operations for memory cells, the data to be programmed (write data) is stored in the set of data latches 340-346 from the data bus 334. During reprogramming, a respective set of data latches of a memory cell can store data indicating when to enable the memory cell for reprogramming based on the program pulse magnitude.

The program operation, under the control of the state machine 262, applies a series of programming voltage pulses to the control gates of the addressed memory cells. Each voltage pulse may be stepped up in magnitude from a previous program pulse by a step size in a processed referred to as incremental step pulse programming. Each program voltage is followed by a verify operation to determine if the memory cells has been programmed to the desired memory state. In some cases, processor 330 monitors the read back memory state relative to the desired memory state. When the two agree, processor 330 sets the bit line in a program inhibit mode such as by updating its latches. This inhibits the memory cell coupled to the bit line from further programming even if additional program pulses are applied to its control gate.

FIG. 4A is a block diagram explaining one example organization of memory structure 202, which is divided into two planes 402 and 404. Each plane is then divided into M blocks. In one example, each plane has about 2000 blocks. However, different numbers of blocks and planes can also be used. In on embodiment, a block of memory cells is a unit of erase. That is, all memory cells of a block are erased together. In other embodiments, blocks can be divided into sub-blocks and the sub-blocks can be the unit of erase. Memory cells can also be grouped into blocks for other reasons, such as to organize the memory structure to enable the signaling and selection circuits. In some embodiments, a block represents a groups of connected memory cells as the memory cells of a block share a common set of word lines. For example, the word lines for a block are all connected to all of the vertical NAND strings for that block. Although FIG. 4A shows two planes 402/404, more or fewer than two planes can be implemented. In some embodiments, memory structure 202 includes four planes. In some embodiments, memory structure 202 includes eight planes. In some embodiments, programming can be performed in parallel in a first selected block in plane 402 and a second selected block in plane 404.

Figure 4B:
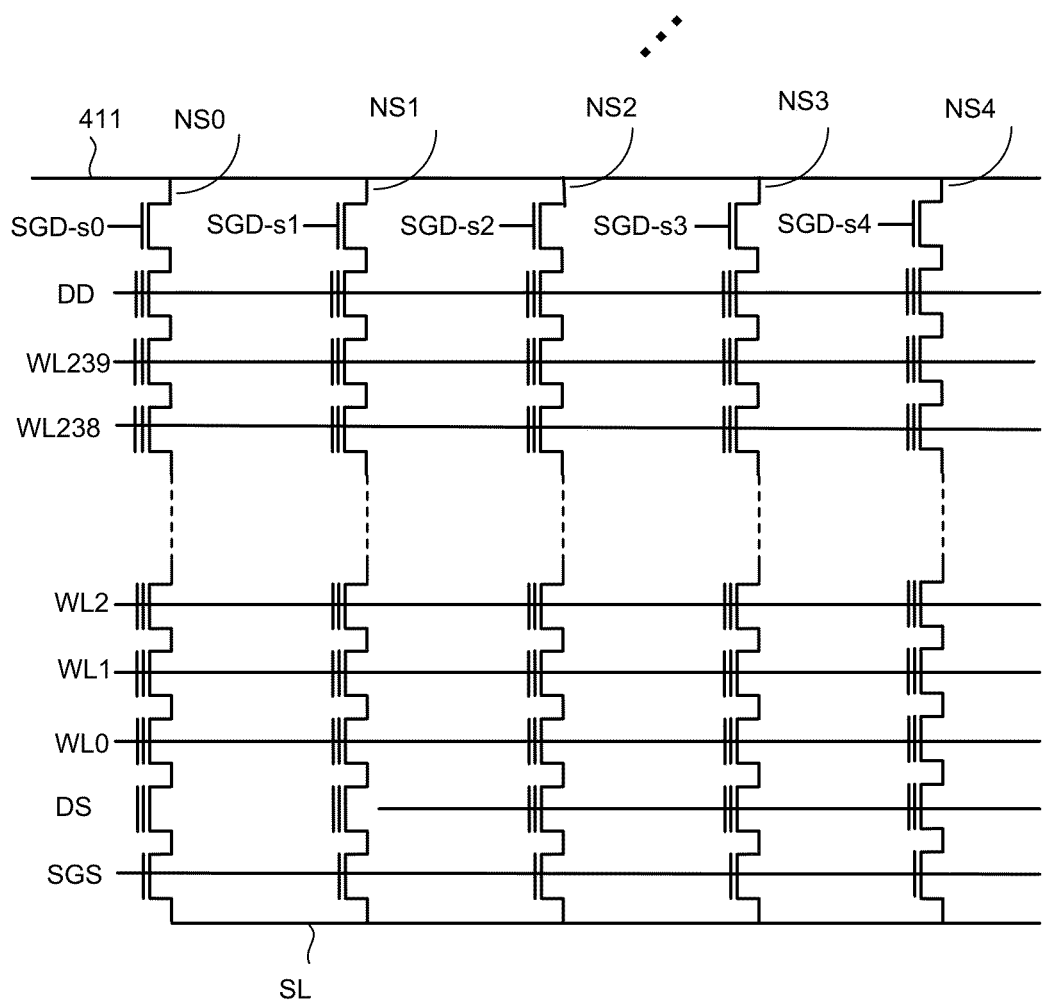
FIG. 4B is a schematic of a plurality of NAND strings in multiple sub-blocks of a same block.

FIG. 4B is a schematic diagram of a portion of the memory array 202. FIG. 4B shows physical data word lines WL0-WL239 running across the entire block. The structure of FIG. 4B corresponds to a portion 406 in Block 2 of FIG. 4A, including bit line 411. Within the block, in one embodiment, each bit line is connected to five NAND strings. Thus, FIG. 4B shows bit line connected to NAND string NS0, NAND string NS1, NAND string NS2, NAND string NS3, and NAND string NS4.

In one embodiment, there are five drain side select lines in the block (SGD-s0, SGD-s1, SGD-s2, SGD-s3, and SGD-s4). Each respective drain side select line can be selected independent of the others. Each drain side select line connects to a group of NAND strings in the block. Only one NAND string of each group is depicted in FIG. 4B. These five drain side select lines correspond to five sub-blocks. A first sub-block corresponds to those vertical NAND strings controlled by SGD-s0. A second sub-block corresponds to those vertical NAND strings controlled by SGD-s1. A third sub-block corresponds to those vertical NAND strings controlled by SGD-s2. A fourth sub-block corresponds to those vertical NAND strings controlled by SGD-s3. A fifth sub-block corresponds to those vertical NAND strings controlled by SGD-s4. As noted, FIG. 4B only shows the NAND strings connected to bit line 411. However, a full schematic of the block would show every bit line and five vertical NAND strings connected to each bit line.

Although the example memories of FIGS. 4A-4B are three dimensional memory structure that includes vertical NAND strings, other (2D and 3D) memory structures can also be used with the technology described herein.

The memory systems discussed above can be erased, programmed and read. At the end of a successful programming process, the threshold voltages of the memory cells should be within one or more distributions of threshold voltages for programmed memory cells or within a distribution of threshold voltages for erased memory cells, as appropriate. FIG. 5A is a graph of threshold voltage versus number of memory cells, and illustrates example threshold voltage distributions for the memory array when each memory cell stores one bit of data per memory cell. Memory cells that store one bit of data per memory cell data are referred to as single level cells ("SLC"). The data stored in SLC memory cells is referred to as SLC data; therefore, SLC data comprises one bit per memory cell. Data stored as one bit per memory cell is SLC data. FIG. 5A shows two threshold voltage distributions: E and P. Threshold voltage distribution E corresponds to an erased data state. Threshold voltage distribution P corresponds to a programmed data state. Memory cells that have threshold voltages in threshold voltage distribution E are, therefore, in the erased data state (e.g., they are erased). Memory cells that have threshold voltages in threshold voltage distribution P are, therefore, in the programmed data state (e.g., they are programmed). In one embodiment, erased memory cells store data "1" and programmed memory cells store data "0." FIG. 5A depicts read reference voltage Vr. By testing (e.g., performing one or more sense operations) whether the threshold voltage of a given memory cell is above or below Vr, the system can determine a memory cells is erased (state E) or programmed (state P). FIG. 5A also depicts verify reference voltage Vv. In some embodiments, when programming memory cells to data state P, the system will test whether those memory cells have a threshold voltage greater than or equal to Vv.

Memory cells that store multiple bit per memory cell data are referred to as multi-level cells ("MLC"). The data stored in MLC memory cells is referred to as MLC data; therefore, MLC data comprises multiple bits per memory cell. Data stored as multiple bits of data per memory cell is MLC data. In the example embodiment of FIG. 5B, each memory cell stores three bits of data. Other embodiments may use other data capacities per memory cell (e.g., such as two, four, or five bits of data per memory cell).

FIG. 5B shows eight threshold voltage distributions, corresponding to eight data states. The first threshold voltage distribution (data state) Er represents memory cells that are erased. The other seven threshold voltage distributions (data states) A - G represent memory cells that are programmed and, therefore, are also called programmed states. Each threshold voltage distribution (data state) corresponds to predetermined values for the set of data bits. The specific relationship between the data programmed into the memory cell and the threshold voltage levels of the cell depends upon the data encoding scheme adopted for the cells. In one embodiment, data values are assigned to the threshold voltage ranges using a Gray code assignment so that if the threshold voltage of a memory erroneously shifts to its neighboring physical state, only one bit will be affected.

FIG. 5B shows seven read reference voltages, VrA, VrB, VrC, VrD, VrE, VrF, and VrG for reading data from memory cells. By testing (e.g., performing sense operations) whether the threshold voltage of a given memory cell is above or below the seven read reference voltages, the system can determine what data state (i.e., A, B, C, D, ...) a memory cell is in. FIG. 5B also shows a number of verify reference voltages. The verify high voltages are VvA, VvB, VvC, VvD, VvE, VvF, and VvG. In some embodiments, when programming memory cells to data state A, the system will test whether those memory cells have a threshold voltage greater than or equal to VvA. If the memory cell has a threshold voltage greater than or equal to VvA, then the memory cell is locked out from further programming. Similar reasoning applies to the other data states.

In an embodiment that utilizes full sequence programming, memory cells can be programmed from the erased data state Er directly to any of the programmed data states A-G using the process of FIG. 6 (discussed below). For example, a population of memory cells to be programmed may first be erased so that all memory cells in the population are in erased data state Er. Then, a programming process is used to program memory cells directly into data states A, B, C, D, E, F, and/or G. For example, while some memory cells are being programmed from data state ER to data state A, other memory cells are being programmed from data state ER to data state B and/or from data state ER to data state C, and so on. The arrows of FIG. 5B represent the full sequence programming. In some embodiments, data states A-G can overlap, with control die 211 and/or memory controller 120 relying on error correction to identify the correct data being stored. Note that in some embodiments, rather than using full sequence programming, the system can use multi-pass programming processes known in the art.

Figure 6:
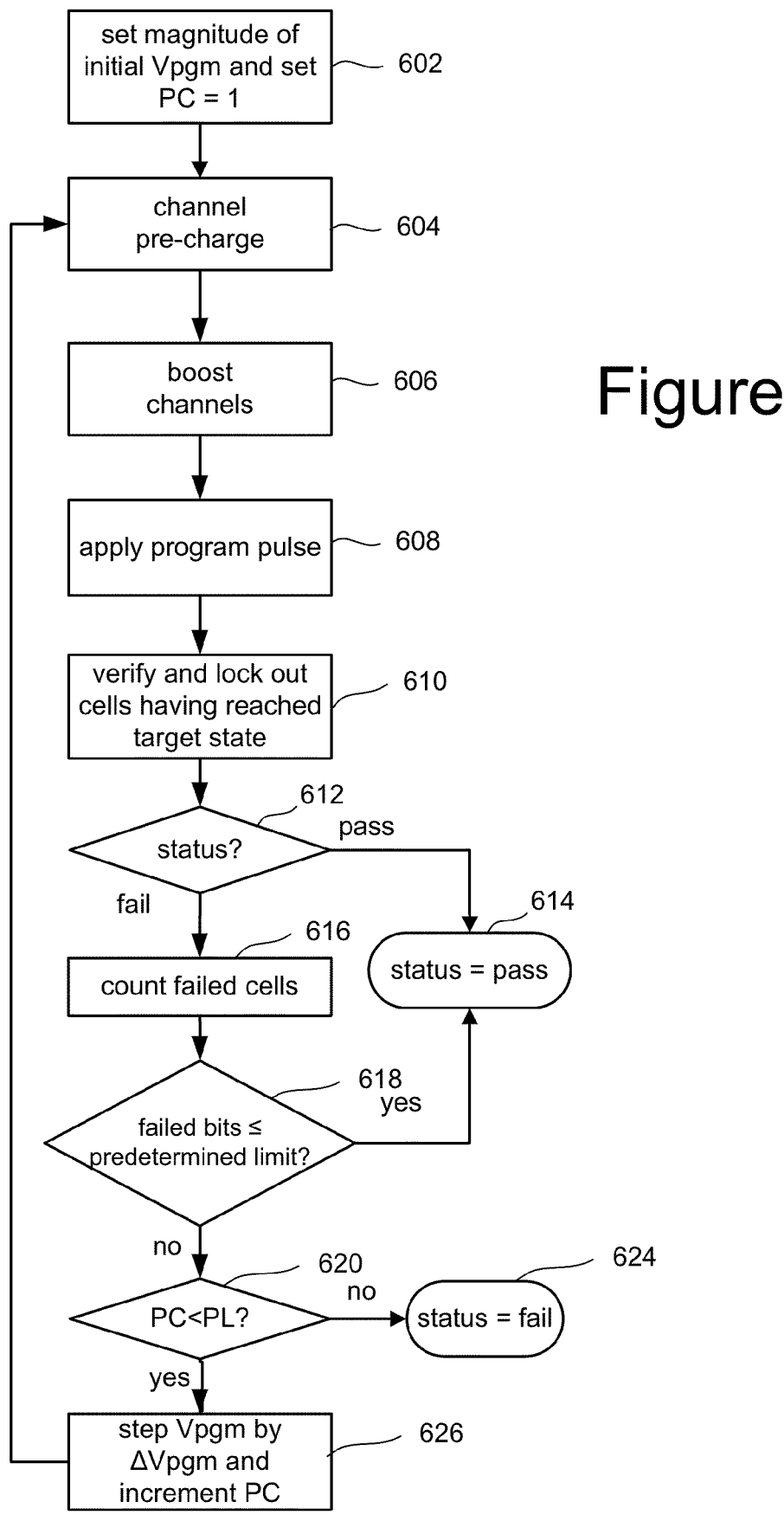
FIG. 6 is a flow chart describing one embodiment of a process for programming non-volatile memory.

FIG. 6 is a flowchart describing one embodiment of a process for programming memory cells. For purposes of this document, the term program and programming are synonymous with write and writing. The process may be used to program user data, as well as parity data (e.g., primary parity, secondary parity) for that user data. When programming user data, primary parity, or secondary parity, an ECC codeword may be programmed for each unit (e.g., page). In one example embodiment, the process of FIG. 6 is performed for memory array 202 using the one or more control circuits (e.g., system control logic 260, column control circuitry 210, row control circuitry 220) discussed above. In one example embodiment, the process of FIG. 6 is performed by integrated memory assembly 207 using the one or more control circuits (e.g., system control logic 260, column control circuitry 210, row control circuitry 220) of control die 211 to program memory cells on memory structure die 201. The process includes multiple loops, each of which includes a program phase and a verify phase. The process of FIG. 6 is performed to implement the full sequence programming, as well as other programming schemes including multi-stage programming. When implementing multi-stage programming, the process of FIG. 6 is used to implement any/each stage of the multi-stage programming process.

Typically, the program voltage applied to the control gates (via a selected data word line) during a program operation is applied as a series of program pulses (e.g., voltage pulses). Between programming pulses are a set of verify pulses (e.g., voltage pulses) to perform verification. In many implementations, the magnitude of the program pulses is increased with each successive pulse by a predetermined step size. In step 602 of FIG. 6, the programming voltage signal (Vpgm) is initialized to the starting magnitude (e.g., ~12-16 V or another suitable level) and a program counter PC maintained by state machine 262 is initialized at 1. In one embodiment, the group of memory cells selected to be programmed (referred to herein as the selected memory cells) are programmed concurrently and are all connected to the same word line (the selected word line). There will likely be other memory cells that are not selected for programming (unselected memory cells) that are also connected to the selected word line. That is, the selected word line will also be connected to memory cells that are supposed to be inhibited from programming. Additionally, as memory cells reach their intended target data state, they will be inhibited from further programming. Those NAND strings (e.g., unselected NAND strings) that include memory cells connected to the selected word line that are to be inhibited from programming have their channels boosted to inhibit programming. When a channel has a boosted voltage, the voltage differential between the channel and the word line is not large enough to cause programming. To assist in the boosting, in step 604 the control die will pre-charge channels of NAND strings that include memory cells connected to the selected word line that are to be inhibited from programming. In step 606, NAND strings that include memory cells connected to the selected word line that are to be inhibited from programming have their channels boosted to inhibit programming. Such NAND strings are referred to herein as "unselected NAND strings." In one embodiment, the unselected word lines receive one or more boosting voltages (e.g., ~7-11 volts) to perform boosting schemes. A program inhibit voltage is applied to the bit lines coupled the unselected NAND string.

In step 608, a program voltage pulse of the programming voltage signal Vpgm is applied to the selected word line (the word line selected for programming). If a memory cell on a NAND string should be programmed, then the corresponding bit line is biased at a program enable voltage. In step 608, the program pulse is concurrently applied to all memory cells connected to the selected word line so that all of the memory cells connected to the selected word line are programmed concurrently (unless they are inhibited from programming). That is, they are programmed at the same time or during overlapping times (both of which are considered concurrent). In this manner all of the memory cells connected to the selected word line will concurrently have their threshold voltage change, unless they are inhibited from programming.

In step 610, program verify is performed and memory cells that have reached their target states are locked out from further programming by the control die. Step 610 may also include determining whether a memory cell should receive slow programming during the next program loop, as opposed to full programming. Step 610 includes performing verification of programming by sensing at one or more verify reference levels. In one embodiment, the verification process is performed by testing whether the threshold voltages of the memory cells selected for programming have reached the appropriate verify reference voltage. In step 610, a memory cell may be locked out after the memory cell has been verified (by a test of the Vt) that the memory cell has reached its target state. For example, a memory cell may be locked out if it reaches a verify high voltage. If a memory cell has a Vt between the verify low voltage and the verify high voltage, then the memory cell may be marked for slow programing the next program loop. In one embodiment, one or more data latches in the managing circuit 302 are used to indicate whether a memory cell is locked out, is to receive slow programming, or is to receive full programming.

If, in step 612, it is determined that all of the memory cells have reached their target threshold voltages (pass), the programming process is complete and successful because all selected memory cells were programmed and verified to their target states. A status of "PASS" is reported in step 614. Otherwise if, in step 612, it is determined that not all of the memory cells have reached their target threshold voltages (fail), then the programming process continues to step 616.

In step 616, the number of memory cells that have not yet reached their respective target threshold voltage distribution are counted. That is, the number of memory cells that have, so far, failed to reach their target state are counted. This counting can be done by state machine 262, memory controller 120, or another circuit. In one embodiment, there is one total count, which reflects the total number of memory cells currently being programmed that have failed the last verify step. In another embodiment, separate counts are kept for each data state.

In step 618, it is determined whether the count from step 616 is less than or equal to a predetermined limit. In one embodiment, the predetermined limit is the number of bits that can be corrected by error correction codes (ECC) during a read process for the page of memory cells. If the number of failed cells is less than or equal to the predetermined limit, than the programming process can stop and a status of "PASS" is reported in step 614. In this situation, enough memory cells programmed correctly such that the few remaining memory cells that have not been completely programmed can be corrected using ECC during the read process. In some embodiments, the predetermined limit used in step 618 is below the number of bits that can be corrected by error correction codes (ECC) during a read process to allow for future/additional errors. When programming less than all of the memory cells for a page, or comparing a count for only one data state (or less than all states), than the predetermined limit can be a portion (pro-rata or not pro-rata) of the number of bits that can be corrected by ECC during a read process for the page of memory cells. In some embodiments, the limit is not predetermined. Instead, it changes based on the number of errors already counted for the page, the number of program-erase cycles performed or other criteria.

If the number of failed memory cells is not less than the predetermined limit, than the programming process continues at step 620 and the program counter PC is checked against the program limit value (PL). Examples of program limit values include 6, 12, 16, 19, 20 and 30; however, other values can be used. If the program counter PC is not less than the program limit value PL, then the program process is considered to have failed and a status of FAIL is reported in step 624. If the program counter PC is less than the program limit value PL, then the process continues at step 626 during which time the Program Counter PC is incremented by 1 and the programming voltage signal Vpgm is stepped up to the next magnitude. For example, the next pulse will have a magnitude greater than the previous pulse by a step size ΔVpgm (e.g., a step size of 0.1 - 1.0 volts). After step 626, the process loops back to step 604 and another program pulse is applied to the selected word line (by the control die) so that another iteration (steps 604-626) of the programming process of FIG. 6 is performed.

In one embodiment memory cells are erased prior to programming, and erasing is the process of changing the threshold voltage of one or more memory cells from a programmed data state to an erased data state. For example, changing the threshold voltage of one or more memory cells from state P to state E of FIG. 5A, or from states A-G to state Er of FIG. 5B.

One technique to erase memory cells in some memory devices is to bias a p-well (or other types of) substrate to a high voltage to charge up a NAND channel. An erase enable voltage (e.g., a low voltage) is applied to control gates of memory cells while the NAND channel is at a high voltage to erase the non-volatile storage elements (memory cells). Herein, this is referred to as p-well erase.

Another approach to erasing memory cells is to generate gate induced drain leakage (GIDL) current to charge up the NAND string channel. An erase enable voltage is applied to control gates of the memory cells, while maintaining the NAND string channel potential to erase the memory cells. Herein, this is referred to as GIDL erase. Both p-well erase and GIDL erase may be used to lower the threshold voltage (Vt) of memory cells.

In one embodiment, the GIDL current is generated by causing a drain-to-gate voltage at a select transistor (e.g., SGD and/or SGS). A transistor drain-to-gate voltage that generates a GIDL current is referred to herein as a GIDL voltage. The GIDL current may result when the select transistor drain voltage is significantly higher than the select transistor control gate voltage. GIDL current is a result of carrier generation, i.e., electron-hole pair generation due to band-to-band tunneling and/or trap-assisted generation. In one embodiment, GIDL current may result in one type of carriers, e.g., holes, predominantly moving into NAND channel, thereby raising potential of the channel. The other type of carriers, e.g., electrons, are extracted from the channel, in the direction of a bit line or in the direction of a source line, by an electric field. During erase, the holes may tunnel from the channel to a charge storage region of memory cells and recombine with electrons there, to lower the threshold voltage of the memory cells.

The GIDL current may be generated at either end of the NAND string. A first GIDL voltage may be created between two terminals of a select transistor (e.g., drain side select transistor) that is connected to or near a bit line to generate a first GIDL current. A second GIDL voltage may be created between two terminals of a select transistor (e.g., source side select transistor) that is connected to or near a source line to generate a second GIDL current. Erasing based on GIDL current at only one end of the NAND string is referred to as a one-sided GIDL erase. Erasing based on GIDL current at both ends of the NAND string is referred to as a two-sided GIDL erase.

FIG. 7 is a table that shows locations in non-volatile memory for user data and parity data for one embodiment of smart re-use of a parity buffer. The diagram also illustrates one possible way to form parity data from user data at specific locations in the non-volatile memory. The example is for programming data into open blocks on four memory die. Each memory die has four planes in this example. Recall from FIG. 4A that each plane has many blocks. In this example one block is programmed on each plane. Thus, there are 16 blocks in this example. The 16 blocks may be programmed in parallel. For example, one page of data (either user data or parity data) can be programmed into each respective block in parallel.

Each block has 81 word lines in this example. Only word lines 0, 1, and 80 are represented in FIG. 7. Consistent with the example in FIG. 4B, there are five sub-blocks in each block. Units of data (either user data or parity data) are programmed in what is referred to herein as a page. A page is programmed into a what is referred to herein as a physical page of memory cells, such that each memory cell receives one bit of the page. For MLC data, multiple pages are programmed into the physical page of memory cells. For example, three pages of user data may be programmed into a physical page of memory cells by programming one bit of each page into each memory cell. Therefore, each memory cell will store three bits. In a NAND embodiment, each physical page of memory cells resides in the same block. Also, in a NAND embodiment, each physical page of memory cells is connected to the same word line. In one embodiment, a page of user data is 16 KB. However, a page could be larger or smaller. Also, the ECC engine 158 may form an ECC codeword from each page of user data. The ECC codeword that is stored will be larger than the page of user data (for example, larger than 16 KB).

FIG. 7 depicts an SLC example in which one bit is programmed into each memory cell. Stated another way, one page of data is programmed into each physical page of memory cells. A total of 404 pages may be programmed in each block in this example. FIG. 7 represents an example for when programming a selected block in each of the planes. For example, page 0 may be programmed in WL0, sub-block 0 of each of the 16 planes, page 1 may be programmed in WL0, sub-block 1 of each of the 16 planes, etc. In this example, only memory die 0 has user data programmed into WL80, sub-block 4. Parity data is programmed into WL0, sub-block 4 of memory dies 1, 2, and 3. Thus, 12 pages of parity data are stored in this example. The parity data includes 10 pages of primary parity and 2 pages of secondary parity. In this example, the parity data is stored at the end of some of the blocks. However, the parity data could be stored elsewhere in the blocks. In another embodiment, the block has 162 word lines with each block being divided into a lower tier (e.g., WL0 – WL80) and an upper tier (e.g., WL81 – WL162). In this case, the parity data for the lower tier could be stored in WL80, and the parity data for the upper tier could be stored in WL162.

The primary parity is labeled PP0 – PP9 in FIG. 7. The secondary parity is labeled SP1 and SP2. In some embodiments, the primary parity is the successive bitwise XOR of a number of pages of user data. In some embodiments, the primary parity is formed from the user data itself, prior to an ECC codeword being formed for the user data. However, the ECC engine 158 may be used to form an ECC codeword for each page of primary parity, such that the primary parity can be stored as an ECC codeword.

The primary parity PP0 is the successive bitwise XOR of all pages stored in memory locations having a 0 in FIG. 7. Only a few of those memory locations are shown in FIG. 7. Those pages include page 0 on all four dies (stored in WL0, sub-block 0) and page 400 on all four dies (stored on WL 80, sub-block 0). There will also be pages for sub-block 0 for all of the even word lines between WL0 and WL80. Thus, the primary parity PP0 is formed from a successive bitwise XOR of page 0 stored in the 16 planes of the four dies (i.e., 15 successive bitwise XORs), followed by successive bitwise XORs of page 10 stored in the 16 planes of the four dies, etc. The primary parity is accumulated in a parity buffer in local volatile memory 140 until a final accumulation is reached. In this example, the final accumulation is reached after the successive bitwise XOR for each page 400 that is programmed to WL80, sub-block 0 of each plane. After the final accumulation is reached, the primary parity PP0 is written to WL80, sub-block 4, of memory die 1. As noted, the ECC engine 158 may form an ECC codeword for PP0, which is what is stored in non-volatile memory.

In some embodiments the secondary parity is a successive bitwise XOR of pages of the primary parity. In one embodiment, SP1 = PP0 XOR PP2 XOR PP4 XOR PP6 XOR PP8. In one embodiment, SP2 = PP1 XOR PP3 XOR PP5 XOR PP7 XOR PP9. Therefore, the secondary parity can be used to recovery the primary parity. For example, if PP4 cannot be read and decoded from the non-volatile memory, PP4 can be recovered from PP0, PP2, PP6, PP8, and SP1. In some embodiments, all of the primary parity PP0 - PP9 and the secondary parity SP1, SP2 are programmed in parallel, which saves programming time.

FIG. 8 is a diagram of an embodiment of parity buffer. FIG. 8 illustrates smart re-use of the parity buffer 800 to accumulate secondary parity. In an embodiment, the parity buffer resides in local high speed volatile memory 140. The parity buffer 800 is divided into 10 bins 802(1) – 802(9). Each bin 802 is used to accumulate primary parity 810 for a set of user data pages. Bin 802(0) is used to accumulate primary parity PP0. Bin(0) is at memory address X in the parity buffer 800. Bin 802(1) is used to accumulate primary parity PP1. Bin 802(1) is used to accumulate primary parity PP1 and is at a memory address X + (1 * Page size) in the parity buffer 800. For example, if the page size is 16 KB, then Bin 1 has an address of X + 16 K. Bin 802(2) is used to accumulate primary parity PP2 and is at memory address X + (2 * Page size) in the parity buffer 800. Bin 802(3) is used to accumulate primary parity PP3 and is at memory address X + (3 * Page size) in the parity buffer 800. Bin 802(4) is used to accumulate primary parity PP4 and is at memory address X + (4 * Page size) in the parity buffer 800. Bin 802(5) is used to accumulate primary parity PP5 and is at memory address X + (5 * Page size) in the parity buffer 800.

Bin 802(6) is used to accumulate primary parity PP6 and is at memory address X + (6 * Page size) in the parity buffer 800. Bin 802(7) is used to accumulate primary parity PP7 and is at memory address X + (7 * Page size) in the parity buffer 800. Bin 802(8) is used to accumulate primary parity PP8 and is at memory address X + (8 * Page size) in the parity buffer 800. Bin 802(9) is used to accumulate primary parity PP9 and is at memory address X + (9 * Page size) in the parity buffer 800.

In an embodiment, the parity buffer 800 is smartly re-used to accumulate secondary parity 820. In the example of FIG. 8, secondary parity SP1 is accumulated in bin 802(0) and secondary parity SP2 is accumulated in bin 802(1). This reduces the amount of, for example, local high speed volatile memory 140 that is needed for accumulating parity data. The savings for the example in FIG. 8 could be two pages for SLC data. However, the savings for MLC data could be, for example, three or four times as much if three or four bits are stored per memory cell. Also, the memory system might be writing sequential data in one location and random data in another location. The example in FIGS. 7 and 8 can occur simultaneously for these various cases. Therefore, smartly re-using the parity buffer to accumulate secondary parity can substantially reduce the amount of local high speed volatile memory 140 that is needed for accumulating parity data.

Figure 9:
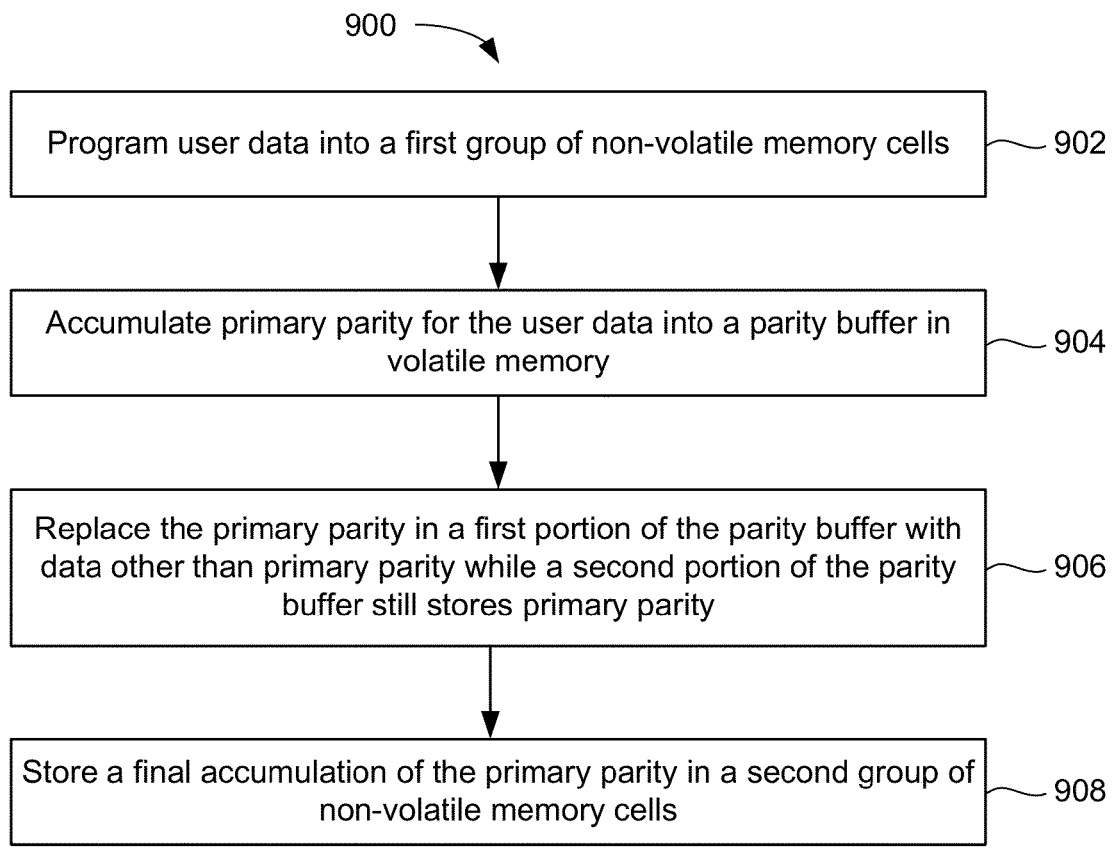
FIG. 9 is a flowchart of one embodiment of a process of managing the storage of data into non-volatile memory cells, including a smart re-use of a parity buffer.

FIG. 9 is a flowchart of one embodiment of a process 900 of managing the storage of data into non-volatile memory cells. The process may be performed by memory controller 120, system control logic 260, column control circuitry 210, and/or row control circuitry 220. In an embodiment, a control circuit that performs process 900 makes efficient use of local high speed volatile memory 140. Therefore, a control circuit that performs process 900 may smartly re-use a parity buffer. The steps of process 900 are described in a certain order to facilitate explanation. The steps could be performed in a different order. The performance of some of the steps could overlap in time.

Step 902 includes programming user data into a first group of non-volatile memory cells. The process of FIG. 6 could be used; however, other programming techniques may be used. The data may be programmed as SLC data or MLC data. Note that the user data can be encoded into an ECC codeword. The user data is programmed in units, which are referred to herein as pages.

In an embodiment, the first group of non-volatile memory cells referred to in step 902 includes many physical pages of memory cells. The physical pages of memory may reside in different of blocks. Some of the blocks may be in different planes on the same memory die. The blocks may be in different memory dies. When programming some types of memory, such as NAND, all of the memory cells of the block are first erased. These blocks are referred to as open blocks when there are still physical pages of memory cells that are unprogrammed. After all of the physical pages of memory cells have been programmed, the block is referred to herein as a closed block.

In some embodiments, multiple planes are programmed in parallel in step 902. In some embodiments, multiple memory dies are programmed in parallel in step 902, with each die having one or more planes. With reference to FIG. 7 as one example, step 902 may include programming user data into WL0 – WL80 in the selected block of planes 0, 1, 2, and 3 of memory dies 0, 1, 2, and 3; with the exception of WL80, sub-block 4 for memory dies 1, 2 and 3. As discussed above, WL80, sub-block 4 of memory dies 1, 2 and 3 may be used for parity data.

Step 904 includes accumulating primary parity for the user data into a buffer in volatile memory. In an embodiment, memory controller 120 accumulates primary parity in the local high speed volatile memory 140. In some embodiments, a page of the primary parity has the same size as a page of the user data. Step 904 may include using XOR engine 166 to accumulate the primary parity. In an embodiment, the memory controller 120 provides the XOR engine 166 with two addresses in volatile memory 140 such that the XOR engine 166 forms a bitwise XOR from a page of data at the two addresses in volatile memory 140 and stores the result at one of the addresses. One of the memory locations is referred to herein as a parity bin 802. The other memory location contains a page of user data. The user data may be stored in a portion of local high speed volatile memory 140 other than the parity buffer 800. Thus, the XOR engine 166 forms a bitwise XOR of the present contents of the parity bin with the user data and stores the result into the parity bin. This XORing happens many times for different pages of user data, such that the parity data is accumulated into the parity bin. In step 904, this accumulation happens for a number of parity bins. With reference to FIG. 8 as one example, step 904 may include accumulating primary parity in bins 802(0) – 802(9) in the parity buffer 800.

Step 906 includes replacing the primary parity in a first portion of the buffer with data other than primary parity while a second portion of the parity buffer still stores primary parity for the user data. In one embodiment, secondary parity is accumulated in a first portion of the buffer while a second portion of the buffer is still being used to store the primary parity for the user data. An example of accumulating secondary parity in a first portion of the buffer (e.g., bins 802(0), 802(1)) while a second portion of the buffer (e.g., bins 802(3) – 802(9)) is still being used to store the primary parity for the user data was discussed above in connection with FIG. 8. In one embodiment, primary parity in the parity buffer is replaced with recovery data for exception handling prior to completing use of the parity buffer to store the primary parity.

Step 908 includes storing a final accumulation of the primary parity into a second group of non-volatile memory cells. With reference to FIG. 7 as one example, the primary parity is programmed into WL80 of sub-block 4 of the selected block in planes 0, 1, 2 and 3 of memory dies 1 and 2, as well as WL80 of sub-block 4 of the selected block in planes 0 and 1 of memory die 3. Step 908 may include transferring the final accumulation of the primary parity from the parity buffer to data latches on one or more memory die. Then, the primary parity is programmed into the second group of non-volatile memory cells. In some embodiments, the primary parity is programmed in parallel with secondary parity for the user data, which saves programming time. In some embodiments, an ECC engine 158 may form an ECC codeword from each page of primary parity, with the ECC codewords being stored in the non-volatile memory cells.

Figure 10:
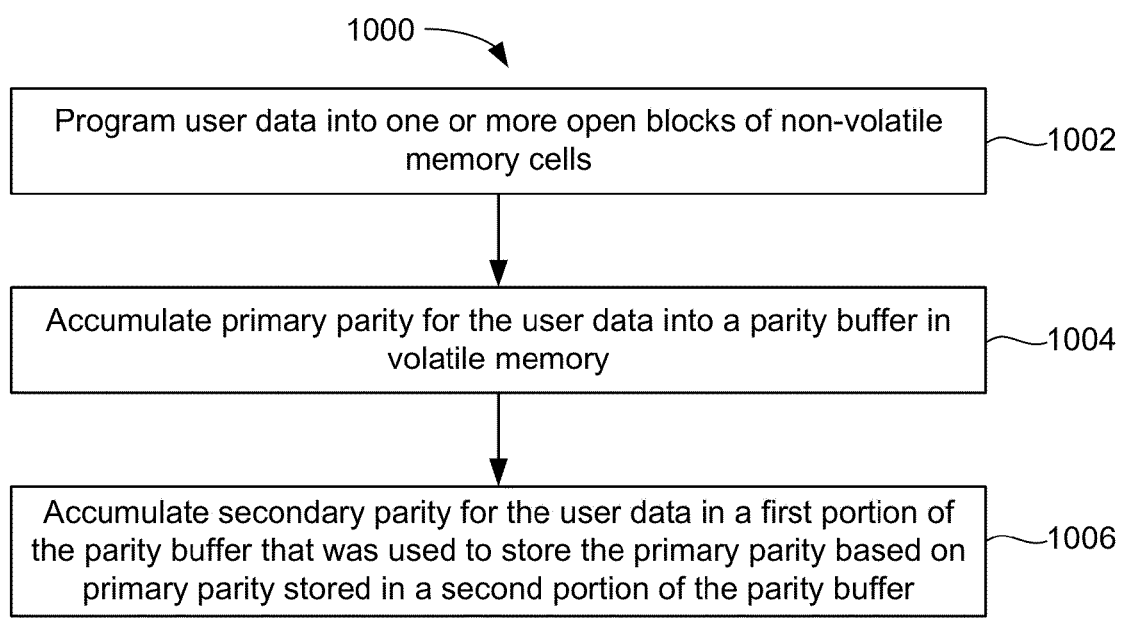
FIG. 10 is a flowchart of one embodiment of a process of accumulating primary parity in a parity buffer and accumulating secondary parity in a portion of the parity buffer that was used to accumulate primary parity.

FIG. 10 is a flowchart of one embodiment of a process 1000 of accumulating secondary parity for user data in a parity buffer. The secondary parity may be accumulated in a portion of the parity buffer that was used to accumulate primary parity. The secondary parity serves as a backup in the event that the primary parity itself cannot be recovered (e.g., read and decoded). The secondary parity may be used to recover the primary parity. Therefore, ultimately the user data is recovered. The process 1000 provides further details of one embodiment of process 900.

Step 1002 includes programming user data into one or more open blocks of non-volatile memory cells. The data may be programmed as SLC data or MLC data.

Step 1004 includes accumulating primary parity for the user data into a parity buffer in volatile memory. In an embodiment, memory controller 120 accumulates primary parity in the local high speed volatile memory 140. Steps 1002 and 1004 may be similar to steps 902 and 904, respectively.

Step 1006 includes accumulating secondary parity for the user data in a first portion of the parity buffer based on primary parity stored in a second portion of the parity buffer. Note that the first portion of the parity buffer was accumulating a first unit of the primary parity (e.g., PP0 and PP1), whereas the second portion of the parity buffer stored primary parity for a second portion of the primary parity (e.g., PP2 - PP9). For example, secondary parity SP1 may be accumulated in bin 802(0) based on PP2, PP4, PP6 and PP8 stored in bins 802(2), 802(4), 802(6) and 802(8). The secondary parity SP1 may also be based on PP0. As another example, secondary parity S21 may be accumulated in bin 802(1) based on PP3, PP5, PP7 and PP9 stored in bins 802(3), 802(5), 802(7) and 802(9). The secondary parity SP2 may also be based on PP1. Step 1006 is one embodiment of step 906.

As discussed in FIGS. 7 and 8, parity data may be accumulated in a parity buffer as user data is written to non-volatile memory cells. FIG. 7 shows further details of an embodiment of how non-volatile memory on memory dies may be used. FIG. 8 shows further details of an embodiment of how a parity buffer may be used.

Figure 11:
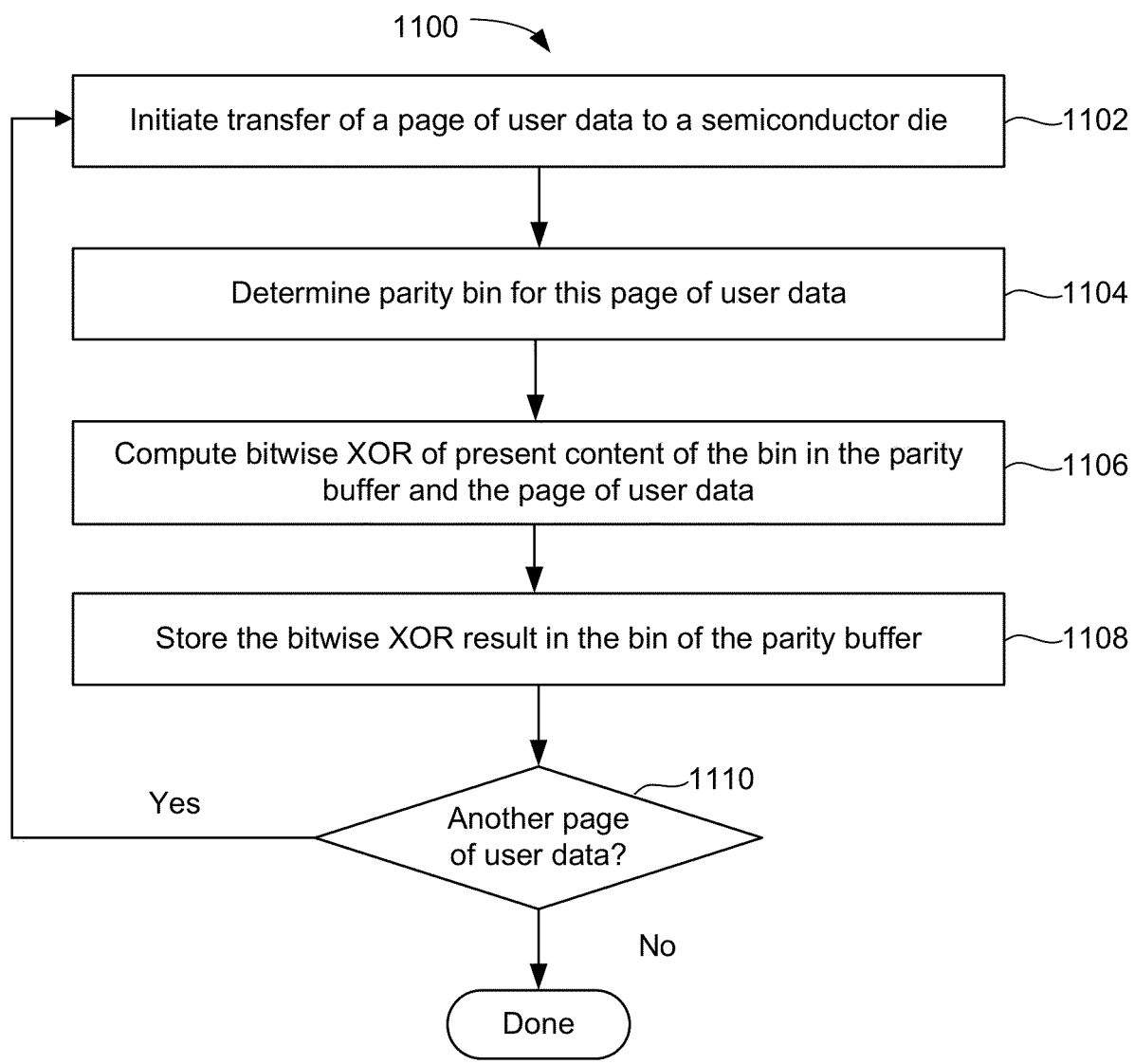
FIG. 11 is a flowchart of one embodiment of a process of accumulating primary parity in a parity buffer.

FIG. 11 is a flowchart of one embodiment of a process 1100 of accumulating primary parity in a parity buffer. The process 1100 may be used in step 904 of process 900 or step 1004 of process 1000, but is not limited to those steps. Step 1102 includes initiating a transfer of a page of user data to a semiconductor die. Prior to the transfer, the page of user data parity may be provided to the ECC engine 158, which may form an ECC codeword from the page of user data. In an embodiment, it is the ECC codeword of the user data that is transferred to the semiconductor die. In one embodiment, the page of user data is transferred to control die 211. The page of user data may be stored in data latches on the semiconductor die. For example, the page of user data could be stored in latches in managing circuit 302 (see latches 340 – 346 in FIG. 3).

Step 1104 includes determining a parity bin for this page of user data. The table in FIG. 9 depicts one example of how pages of user data may be mapped to parity bins.

Step 1106 includes computing a bitwise XOR of present content of the bin in the parity buffer and the page of user data. Step 1106 will result in a new value for the primary parity for this bin. Note that step 1106 could occur prior to or after the transfer of the page of primary parity in bin 802(0) to a semiconductor die. Step 1108 includes storing a page of the primary parity in the bin of the parity buffer.

Step 1110 includes a determination of whether there is another page of user data. If so, step 1102 is performed again. In this iteration of step 1102, another page of user data is involved. For example, with reference to FIG. 8, the process may successively form bitwise XORs for the page 0's in the top row, which corresponds to bin 0. The process 1100 may be repeated for other rows for bin 0.

Figure 12:
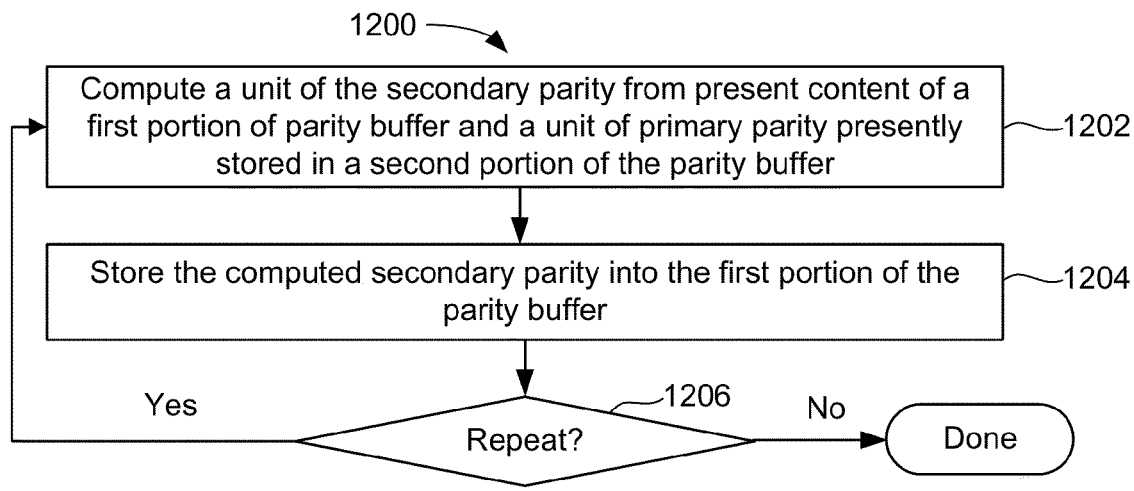
FIG. 12 is a flowchart of one embodiment of a process of accumulating secondary parity in a portion of a parity buffer in which primary parity was accumulated.

FIG. 12 is a flowchart of one embodiment of a process 1200 of accumulating secondary parity in a portion of a parity buffer in which primary parity was accumulated. In an embodiment, process 1200 is initiated after a final accumulation of the primary parity in the parity buffer reached. The process 1200 may be used in step 906 of process 900 or step 1006 of process 1000, but is not limited to those steps. Step 1202 of process 1200 includes computing secondary parity from present content of a first portion of a parity buffer and a unit (e.g., page) of primary parity that is presently stored in a second portion of the parity buffer. Step 1204 includes storing the computed secondary parity into the first portion of the parity buffer. Steps 1202 and 1204 may be repeated a number of times (see step 1206), using different addresses in the parity buffer for the second portion of the parity buffer, to accumulate the secondary parity in the first portion of the parity buffer.

FIG. 8 will be used as to discuss an example of steps 1202 and 1204, but steps 1202 and 1204 are not limited to this example. As one example, in step 1202, secondary parity SP1 is calculated based on the present content of bin 802(0) and the present content of bin 802(2). The XOR engine 166 may form a bitwise XOR of these two bins. In step 1204, the XOR engine 166 stores the result of the bitwise XOR into bin 802(0). Steps 1202 and 1204 may be repeated to accumulate the secondary parity in bin 802(0). For example, in a next iteration, in step 1202, secondary parity SP1 is calculated based on the present content of bin 802(0) and the present content of bin 802(4). The XOR engine 166 may form a bitwise XOR of these two bins. In the second iteration of step 1204, the XOR engine 166 stores the result of this second bitwise XOR into bin 802(0). Steps 1202 and 1204 may be repeated in this manner to successively form the bitwise XOR of the present content of bin 802(0) with bin 802(6), and then with bin 802(8). Therefore, bin 802(0) is used to accumulate the secondary parity. Eventually, a final accumulation of the secondary parity is reached. Process 1200 may also be used in a similar manner for the odd numbered bins to accumulate the secondary parity SP2 into bin 802(1).

Figure 13:
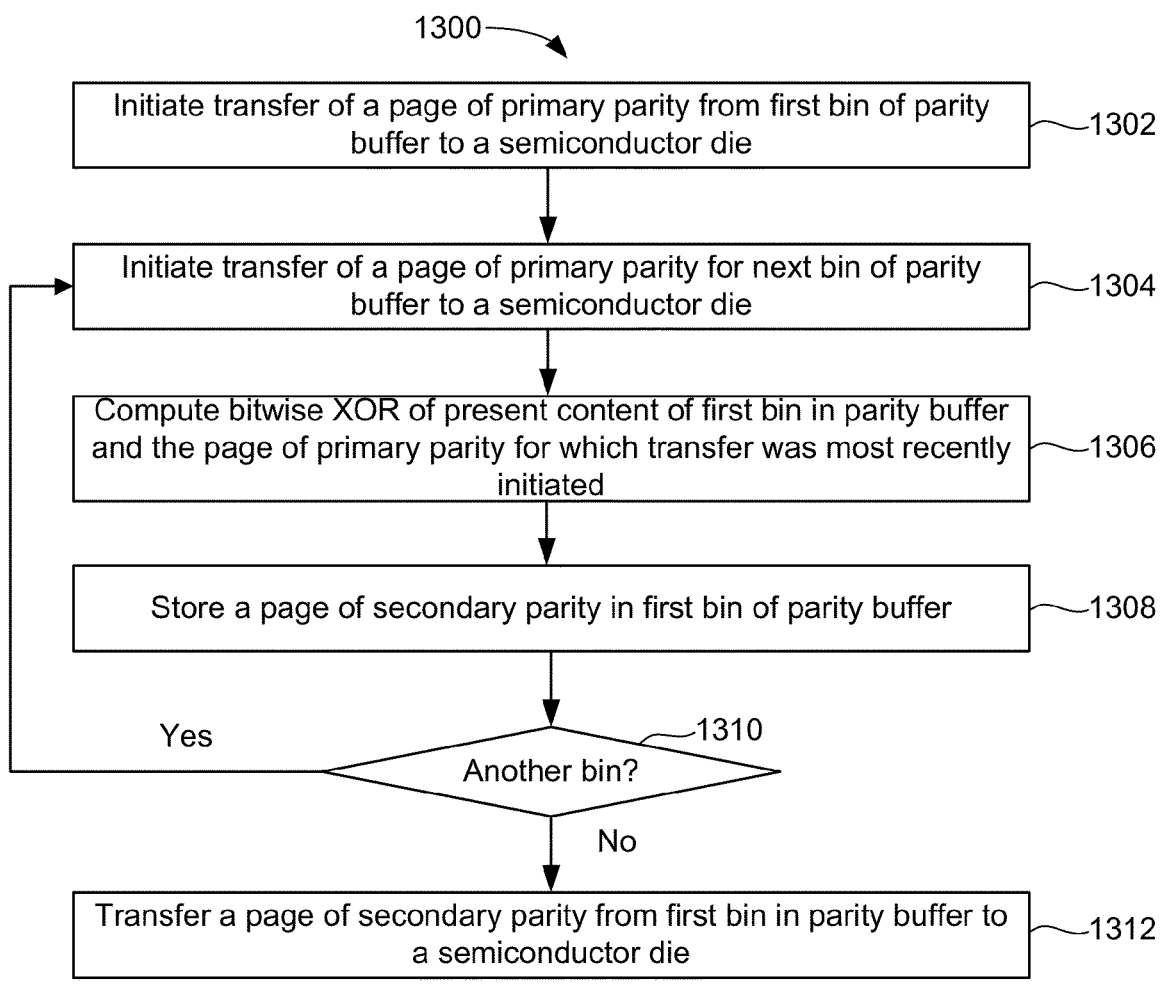
FIG. 13 is a flowchart showing further details of one embodiment of a process of accumulating secondary parity in a portion of a parity buffer in which primary parity was accumulated.

FIG. 13 is a flowchart showing further details of one embodiment of a process 1300 of accumulating secondary parity in a portion of a parity buffer in which primary parity was accumulated. Process 1300 provides further details of one embodiment of process 1200. In an embodiment, process 1300 is initiated after a final accumulation of the primary parity in the parity buffer reached.

Step 1302 includes initiating a transfer of a page of primary parity from a first bin from a parity buffer to a semiconductor die. With reference to FIG. 8, the first bin may be bin 802(0), which stores primary parity PP0. Note that it is a final accumulation of the primary parity that is transferred to the semiconductor die. Prior to the transfer, the page of primary parity may be provided to the ECC engine 158, which may form an ECC codeword from the page of primary parity. In an embodiment, it is the ECC codeword of the primary parity from the first bin that is transferred to the semiconductor die. Throughout this document whether a unit of primary parity such as a page is encoded or not it will be referred to as a unit (e.g., page) of primary parity. In one embodiment, the page of primary parity is transferred to memory die 200. In one embodiment, the page of primary parity is transferred to control die 211. The page of primary parity may be stored in data latches on the semiconductor die. For example, the page of primary parity could be stored in latches in managing circuit 302 (see latches 340 –346 in FIG. 3).

Step 1304 includes initiating a transfer of a page of primary parity from a next bin of the parity buffer to a semiconductor die. The next page of primary parity could be transferred to the same semiconductor die as the first page or to a different semiconductor die. With reference to FIG. 8, the next bin may be bin 802(2), which stores primary parity PP2. This next page of primary parity PP2 may be encoded as an ECC codeword as has been described with respect to primary parity PP0. Also, it is a final accumulation of the primary parity PP2 that is transferred to the semiconductor die.

Step 1306 includes computing a bitwise XOR of present content of the first bin in the parity buffer and the page of primary parity that was most recently initiated for transfer to a semiconductor die (e.g., memory die 200, control die 211). It may be that the page of primary parity was already transferred to the semiconductor die, that the page of primary parity is queued for transfer in memory interface 160, etc. Thus, step 1306 may occur prior to programming of the page of primary parity into non-volatile memory cells, or even the transfer to the semiconductor die.

Step 1306 will result in a new value for the secondary parity. Step 1308 includes storing a page of the secondary parity in the first bin of the parity buffer. For example, the bitwise XOR of bin 802(0) and bin 802(2) is stored in bin 802(0). Note that step 1306 could occur prior to or after the transfer of the page of primary parity in bin 802(0) to a semiconductor die.

As noted, steps 1306 and 1308 may occur, at least in part, prior the actual transfer of the primary parity. For example, each page of primary parity can be sent to the ECC engine to form and ECC codeword, which can be queued on the memory interface 160 for transfer. Step 1306 may operate on the primary parity prior to the encoding of the primary parity. Thus, it will be appreciated that the steps of process 1300 are depicted in a given order as a matter of convenience of explanation.

Step 1310 includes a determination of whether there is another bin to process. In other words, step 1310 includes a determination of whether the final accumulation of the secondary parity has been reached. If not, step 1304 is performed. In this iteration of step 1304 the transfer of another page of primary parity is initiated from the parity buffer. For example, with reference to FIG. 8, the next bin may be bin 802(4), which stores primary parity PP4. Step 1306 includes computing a bitwise XOR of present content of the first bin in the parity buffer and the page of primary parity that was most recently initiated for transfer. This step will result in a new value for the secondary parity. Step 1308 includes storing a page of the secondary parity in the first bin of the parity buffer. For example, the bitwise XOR of bin 802(0) and bin 802(4) is stored in bin 802(0). The process 1300 continues in this manner until a final accumulation of the secondary parity is stored in the first bin (e.g., bin 802(0)).

After the final accumulation of the secondary parity, step 1312 is performed. In step 1312, a page of the secondary parity is transferred from the first bin of the parity buffer to a semiconductor die. Prior to transfer the contents of bin 802(0) may be provided to the ECC engine 158, which may form an ECC codeword. The ECC codeword may be provided to the memory interface 160, which transfers the secondary parity to a semiconductor die.

Figure 14:
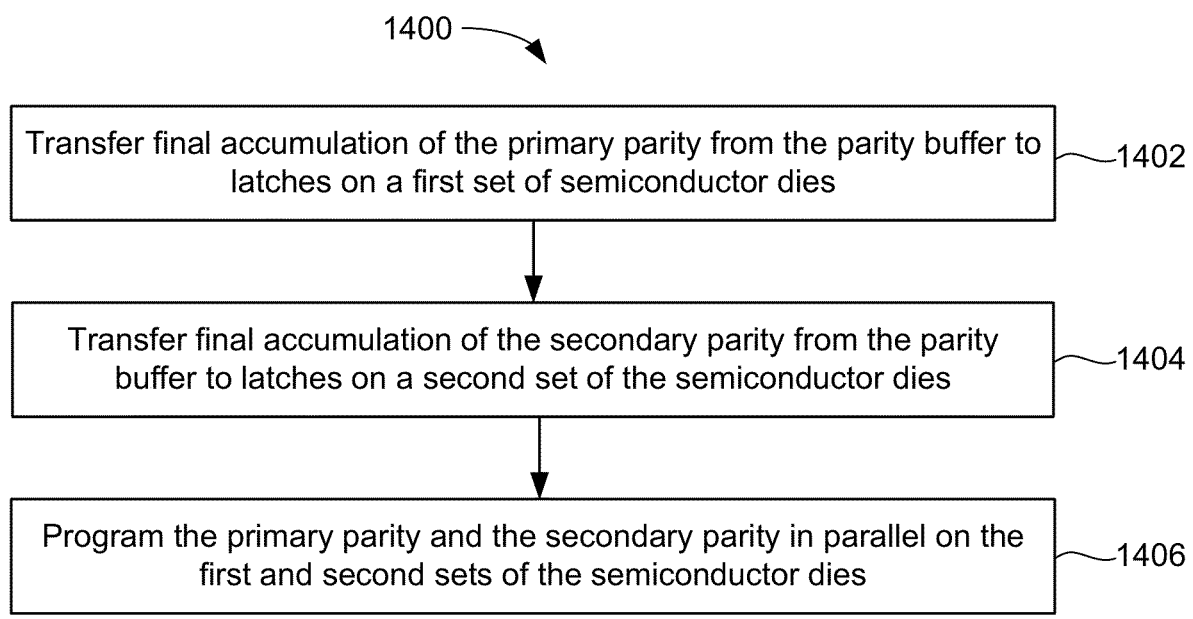
FIG. 14 is a flowchart of one embodiment of a process of programming primary and secondary parity in parallel.

In some embodiments the primary parity and the secondary parity are programmed in parallel, which saves programming time. FIG. 14 is a flowchart of one embodiment of a process 1400 of programming primary and secondary parity in parallel.

Step 1402 includes transferring the final accumulation of the primary parity from the parity buffer to latches on a first set of semiconductor dies. The first set includes one or more semiconductor dies. In one embodiment, all of the semiconductor dies in process 1400 are memory dies 200. In one embodiment, all of the semiconductor dies in process 1400 are control dies 211. The primary parity could be stored in latches in managing circuit 302 (see latches 340 – 346 in FIG. 3). Each of the semiconductor dies may have multiple planes, with each plane having its own set of latches. In one SLC embodiment, a page of primary parity is transferred for each plane. In one MLC embodiment, multiple pages of primary parity are transferred for each plane. Note that the latches on a given plane can store multiple pages of data.

Step 1404 includes transferring the final accumulation of the primary parity from the parity buffer to latches on a second set of semiconductor dies. The second set includes one or more semiconductor dies. The first set and the second set can overlap, but no overlap is required. With respect to the example in FIG. 7, the first set of semiconductor dies may include memory die 1, memory die 2, and memory die 3. The second set of semiconductor dies may include memory die 3. The secondary parity could be stored in latches in managing circuit 302 (see latches 340 – 346 in FIG. 3).

Step 1406 includes programming the primary parity and the secondary parity in parallel on the first and second sets of semiconductor dies. For example, the primary parity and the secondary parity may be programmed in parallel in WL80 of sub-block 4 in respective selected blocks of planes 0-3 of memory die 1, memory die 2, and memory die 3 (see FIG. 7). In one embodiment, the primary parity and the secondary parity are programmed in parallel on at least one of the semiconductor dies, but programming of primary parity on other semiconductor dies is not required to be in parallel with the others. For example, the primary parity and the secondary parity are programmed in parallel on memory die 3 (see FIG. 7); however, the primary parity might be programmed at a different time for memory die 1 and/or memory die 2.

In some embodiments, process 1400 is performed in combination with re-using a first portion of the parity buffer that was used to accumulate primary parity to accumulate secondary parity. For example, process 1400 may be used in combination with process 1000, 1200 or 1300. However, process 1400 may be performed without re-using a first portion of the parity buffer that was used to accumulate primary parity to accumulate secondary parity. In this case, the parallel programming of the primary parity of and the secondary parity still saves programming time, although more volatile memory might be used for the parity buffer.

As described above, one technique disclosed herein for smartly re-using a parity buffer is to accumulate secondary parity in a bin that was used for accumulating primary parity. Another technique is to use one or more of the bins for storing recovery data for exception handling. This storing of recovery data is performed prior to completing use of the parity buffer for the primary parity.

Figure 15:
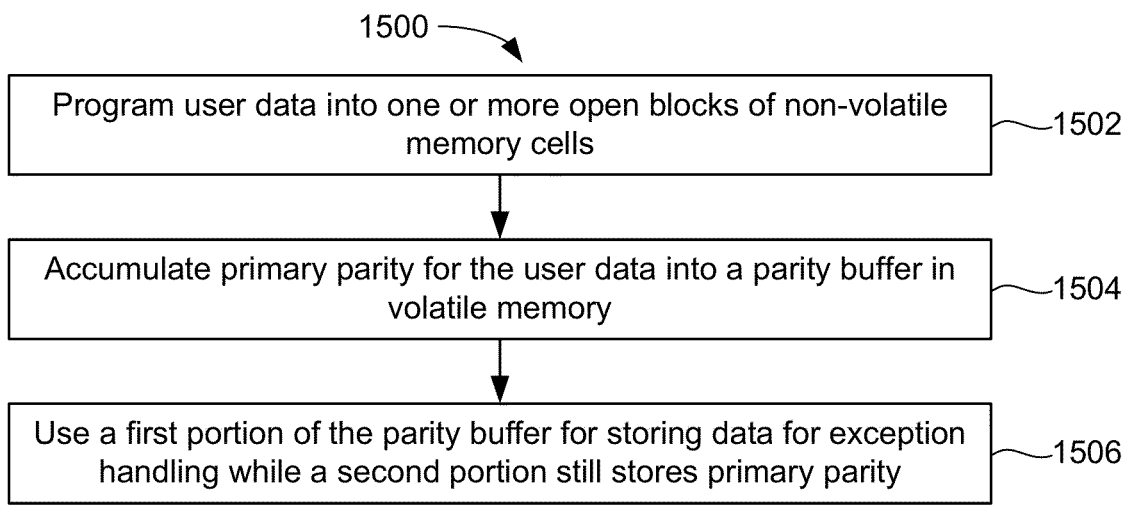
FIG. 15 is a flowchart of one embodiment of a process of smartly re-using a parity buffer for exception handling.

FIG. 15 is a flowchart of one embodiment of a process 1500 of smartly re-using a parity buffer for exception handling. Process 1500 is one embodiment of process 900. Step 1502 includes programming user data into one or more open blocks of non-volatile memory cells. Step 1502 is similar to step 902 and will not be described in detail. Step 1504 includes accumulating primary parity for the user data in a parity buffer in volatile memory. Step 1504 is similar to step 904 and will not be described in detail.

Step 1506 includes using a first portion of the parity buffer for storing data for exception handling while a second portion of the parity buffer still stores primary parity. In one embodiment, n pages of the primary parity data are moved to a temporary location on a semiconductor die, which avoids the need to use volatile memory 140 used by the memory controller 120. User data (e.g., n pages) that was to be programmed into non-volatile memory cells may be temporarily stored in the parity buffer. Eventually, the user data may be transferred to a semiconductor die, and the primary parity may be moved back to the parity buffer. Step 1506 is one embodiment of step 906.

Figure 16:
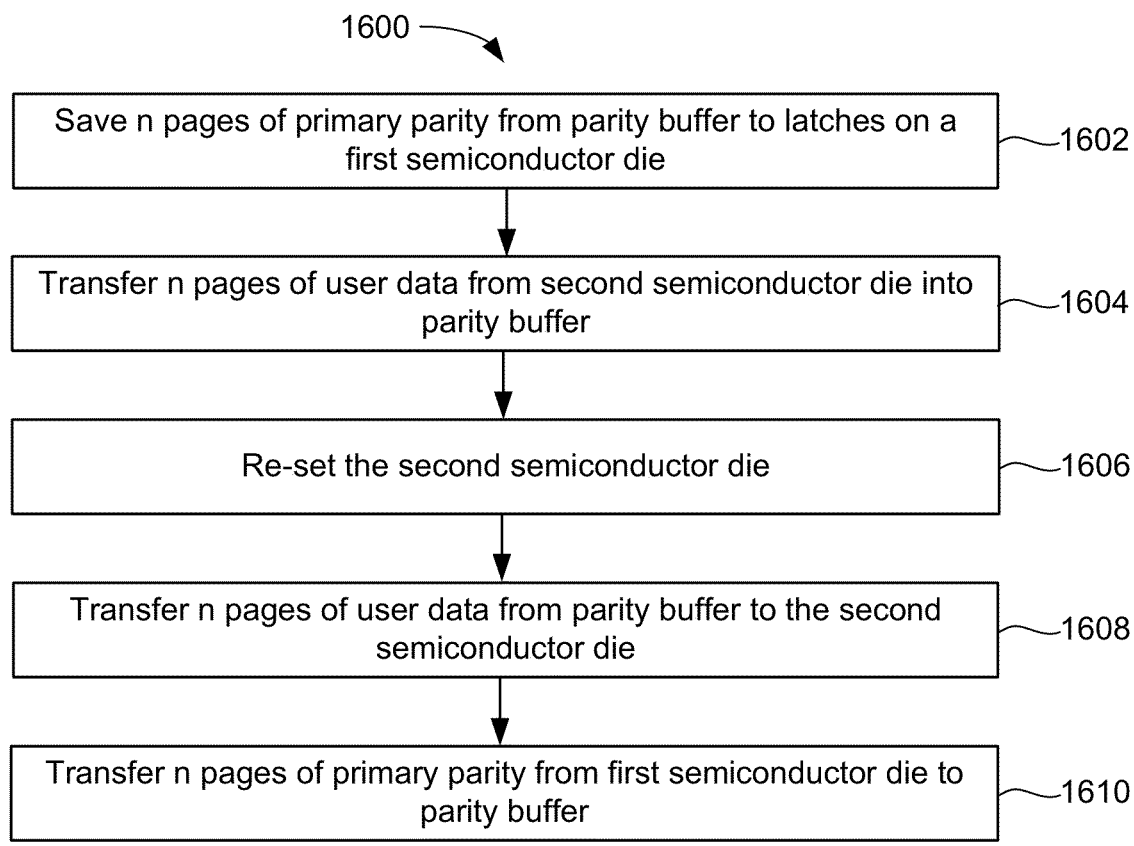
FIG. 16 is a flowchart of one embodiment of further details of a process of smartly re-using a parity buffer for exception handling.

FIG. 16 is a flowchart of one embodiment of a process 1600 of smartly re-using a parity buffer for exception handling. Process 1600 provides further details for one embodiment of process 1500. Process 1600 may be initiated in response to an exception such as a programming error when programming user data into a block of non-volatile memory cells. To handle the exception, the semiconductor die that had the exception may be reset. Therefore, there may be a need to save any user data that was transferred to the semiconductor die, but that has not yet been programmed.

Step 1602 includes saving n pages of primary parity from the parity buffer to latches on a first semiconductor die. In one embodiment, the primary parity is saved to data latches on the first semiconductor die. For example, the primary parity could be stored in latches in managing circuit 302 (see latches 340 – 346 in FIG. 3). With reference to FIG. 8, the primary parity PP0 – PP3 may be transferred to the first semiconductor die, for an example of clearing out four pages of space in the parity buffer. More or fewer than for pages of primary parity may be saved. In one embodiment, the primary parity is transferred to memory die 200. In one embodiment, the primary parity is transferred to control die 211.

Step 1604 includes storing n pages of user data from a second semiconductor die into the parity buffer. This user data is data that has not yet been successfully programmed into the block (or blocks) of non-volatile memory cells. In one embodiment, the user data is transferred from data latches on the second semiconductor die to the memory controller 120. In one embodiment, the user data is transferred from memory die 200. In one embodiment, the user data is transferred from control die 211.

Step 1606 includes re-setting the second semiconductor die. Step 1608 includes transferring the n pages of the user data from the parity buffer to the second semiconductor die. For example, the user data could be stored in latches in managing circuit 302 (see latches 340 – 346 in FIG. 3).

Step 1610 includes transferring the n pages of the primary parity from the first semiconductor die to the parity buffer. Therefore, process 1600 avoids the need to use a separate portion of volatile memory 140 for the recovery data.

A memory system has been described that smartly re-uses a parity buffer. A memory controller 120 may replace primary parity in a first portion of the parity buffer with data other than primary parity while a second portion of the buffer is still being used to store the primary parity. Therefore, the memory controller smartly re-uses the parity buffer, which makes efficient use of the volatile memory. In one embodiment, the memory controller accumulates secondary parity for the user data in a first portion of the parity buffer while a second portion of the parity buffer is still being used to store the primary parity.

A first embodiment includes an apparatus, comprising volatile memory and a control circuit coupled to the volatile memory. The control circuit is configured to communicate with a plurality of non-volatile memory cells. The control circuit is configured to program user data into a first group of the plurality of non-volatile memory cells. The control circuit is configured to accumulate primary parity for the user data in a buffer of the volatile memory. The control circuit is configured to replace a first unit of the primary parity in a first portion of the buffer with data other than primary parity while a second portion of the buffer is still being used to store a second unit of the primary parity. The control circuit is configured to store a final accumulation of the primary parity in the buffer to a second group of the plurality of non-volatile memory cells.

In a second embodiment, in furtherance to the first embodiment, the control circuit is further configured to accumulate, in the first portion of the buffer, secondary parity for the user data based on the second unit of the primary parity stored in the second portion of the buffer.

In a third embodiment, in furtherance to the first or second embodiments, the control circuit is further configured to compute the secondary parity from the first unit of the primary parity and the second unit of the primary parity presently stored in the second portion of the buffer. The control circuit is further configured to store the computed secondary parity into the first portion of the buffer.

In a fourth embodiment, in furtherance to any of the first to third embodiments, the control circuit is further configured to form a successive bitwise XOR between present content of the first portion of the buffer and units of the primary parity stored in portions of the buffer other than the first portion and the second portion until a final calculation of the secondary parity is reached. The control circuit is further configured to successively replace the present content of the first portion of the buffer with the most recent calculation of the secondary parity until a final accumulation of the secondary parity is reached.

In a fifth embodiment, in furtherance any of the first to fourth embodiments, the control circuit is further configured to accumulate the secondary parity in the first portion of the buffer after transfer of the final accumulation of the first unit of the primary parity in the first portion of the buffer to the second group of the non-volatile memory cells has been initiated.

In a sixth embodiment, in furtherance to any of the first or to fifth embodiments, the control circuit is further configured to transfer the final accumulation of the primary parity from the buffer to data latches on a first set of semiconductor dies. The control circuit is further configured to transfer a final accumulation of the secondary parity from the buffer to data latches on a second set of semiconductor dies. The control circuit is further configured to program the primary parity and the secondary parity in parallel from the data latches into the second group of the non-volatile memory cells.

In a seventh embodiment, in furtherance to any of the first to sixth embodiments, the control circuit is further configured to form a successive bitwise XOR between units of the user data and present content of the first portion of the buffer to accumulate the first unit of the primary parity in the first portion of the buffer. The control circuit is further configured to, after a final accumulation of the primary parity has been stored in the buffer, form a successive bitwise XOR between present content of the first portion of the buffer and units of the primary parity in portions of the buffer other than the first portion to accumulate secondary parity in the first portion of the buffer.

In an eighth embodiment, in furtherance to any of the first to seventh embodiments, the control circuit is further configured to replace the first unit of the primary parity in the first portion of the buffer with recovery data for exception handling while the second portion of the buffer is still being used to store the second unit of the primary parity for the user data.

In a ninth embodiment, in furtherance to the eighth embodiment, the control circuit is further configured to transfer the recovery data from a first semiconductor die of a plurality of semiconductor dies to the first portion of the buffer.

In a tenth embodiment, in furtherance to the ninth embodiment, the control circuit is further configured to save the first unit of the primary parity from the first portion of the buffer to a second semiconductor die of the plurality of semiconductor dies prior to transferring the recovery data to the first portion of the buffer.

In an eleventh embodiment, in furtherance to the tenth embodiment, the control circuit is further configured to reset the first semiconductor die after transferring the recovery data to the first portion of the buffer. The control circuit is further configured to transfer the recovery data from the first portion of the buffer to the first semiconductor die after resetting the first semiconductor die. The control circuit is further configured to transfer the first unit of the primary parity from the second semiconductor die to the first portion of the buffer after transferring the recovery data from first portion of the buffer to the first semiconductor die.

One embodiment includes a method of operating non-volatile storage. The method comprises programming user data into non-volatile memory cells on a plurality of semiconductor dies. The method comprises accumulating primary bitwise XOR data for the user data in an XOR buffer in volatile memory. The method comprises transferring a final accumulation of a first unit of the primary bitwise XOR data from a first bin of the XOR buffer to a first semiconductor die of the plurality of semiconductor dies. The method comprises accumulating secondary bitwise XOR data for the user data based on XOR data that is presently stored in the first bin and primary XOR data stored in bins of the XOR buffer other than the first bin.

One embodiment includes a non-volatile storage device comprising a plurality of semiconductor dies, volatile memory, and a memory controller in communication with the volatile memory and the plurality of semiconductor dies. Each semiconductor die comprises blocks of non-volatile memory cells. The memory controller comprises means for programming user data into open blocks on the semiconductor dies. The memory controller comprises means for accumulating primary parity for the user data in parity bins of a buffer of the volatile memory. The memory controller comprises means for accumulating secondary parity for the user data in a first parity bin of the buffer based on present content of the first parity bin and primary parity for the user data stored in other parity bins of the buffer.

In an embodiment, the means for programming user data into open blocks on the semiconductor dies comprises one or more of memory controller 120, system control logic 260, column control circuitry 210, and/or row control circuitry 220. In an embodiment, the means for programming user data into open blocks on the semiconductor dies perform the process of FIG. 6. In an embodiment, the means for programming user data into open blocks on the semiconductor dies comprises one or more of a processor, FPGA, ASIC, integrated circuit, or other type of circuit.

In an embodiment, the means for accumulating primary parity for the user data in parity bins of a buffer of the volatile memory comprises one or more of memory controller 120, processor 156, XOR engine 166, DRAM controller 164. In an embodiment, the means for accumulating primary parity for the user data in parity bins of a buffer of the volatile memory performs the process 1100 of FIG. 11. In an embodiment, the means for accumulating primary parity for the user data in parity bins of a buffer of the volatile memory comprises one or more of a processor, FPGA, ASIC, integrated circuit, or other type of circuit.

In an embodiment, the means for accumulating secondary parity for the user data in a first parity bin of the buffer based on present content of the first parity bin and primary parity for the user data stored in other parity bins of the buffer comprises one or more of memory controller 120, processor 156, XOR engine 166, volatile memory 140, DRAM controller 164. In an embodiment, the means for accumulating secondary parity for the user data in a first parity bin of the buffer based on present content of the first parity bin and primary parity for the user data stored in other parity bins of the buffer performs one or more of process 1200 of FIG. 12 and/or process 1300 of FIG. 13. In an embodiment, the means for accumulating secondary parity for the user data in a first parity bin of the buffer based on present content of the first parity bin and primary parity for the user data stored in other parity bins of the buffer comprises one or more of a processor, FPGA, ASIC, integrated circuit, or other type of circuit.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via one or more intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus comprising:
   volatile memory; and
   a control circuit coupled to the volatile memory, the control circuit configured to communicate with a plurality of non-volatile memory cells, the control circuit configured to:
   program user data into a first group of the plurality of non-volatile memory cells;
   accumulate primary parity for the user data in a buffer of the volatile memory;
   replace a first unit of the primary parity in a first portion of the buffer with data other than primary parity while a second portion of the buffer is still being used to store a second unit of the primary parity; and
   store a final accumulation of the primary parity in the buffer to a second group of the plurality of non-volatile memory cells.

2. The apparatus of claim 1, wherein the control circuit is further configured to:
   accumulate, in the first portion of the buffer, secondary parity for the user data based on the second unit of the primary parity stored in the second portion of the buffer.

3. The apparatus of claim 2, wherein the control circuit is further configured to:
   compute the secondary parity from the first unit of the primary parity and the second unit of the primary parity presently stored in the second portion of the buffer; and
   store the computed secondary parity into the first portion of the buffer.

4. The apparatus of claim 2, wherein the control circuit is further configured to:
   form a successive bitwise XOR between present content of the first portion of the buffer and units of the primary parity stored in portions of the buffer other than the first portion and the second portion until a final calculation of the secondary parity is reached; and
   successively replace the present content of the first portion of the buffer with the most recent calculation of the secondary parity until a final accumulation of the secondary parity is reached.

5. The apparatus of claim 2, wherein the control circuit is further configured to:
   accumulate the secondary parity in the first portion of the buffer after transfer of the final accumulation of the first unit of the primary parity in the first portion of the buffer to the second group of the non-volatile memory cells has been initiated.

6. The apparatus of claim 2, wherein the control circuit is further configured to:
   transfer the final accumulation of the primary parity from the buffer to data latches on a first set of semiconductor dies;
   transfer a final accumulation of the secondary parity from the buffer to data latches on a second set of semiconductor dies; and
   program the primary parity and the secondary parity in parallel from the data latches into the second group of the non-volatile memory cells.

7. The apparatus of claim 1, wherein the control circuit is further configured to:
   form a successive bitwise XOR between units of the user data and present content of the first portion of the buffer to accumulate the first unit of the primary parity in the first portion of the buffer; and
   after a final accumulation of the primary parity has been stored in the buffer, form a successive bitwise XOR between present content of the first portion of the buffer and units of the primary parity in portions of the buffer other than the first portion to accumulate secondary parity in the first portion of the buffer.

8. The apparatus of claim 1, wherein the control circuit is further configured to:
   replace the first unit of the primary parity in the first portion of the buffer with recovery data for exception handling while the second portion of the buffer is still being used to store the second unit of the primary parity for the user data.

9. The apparatus of claim 8, wherein the control circuit is further configured to:
transfer the recovery data from a first semiconductor die of a plurality of semiconductor dies to the first portion of the buffer.

10. The apparatus of claim 9, wherein the control circuit is further configured to:
save the first unit of the primary parity from the first portion of the buffer to a second semiconductor die of the plurality of semiconductor dies prior to transferring the recovery data to the first portion of the buffer.

11. The apparatus of claim 10, wherein the control circuit is further configured to:
reset the first semiconductor die after transferring the recovery data to the first portion of the buffer;
transfer the recovery data from the first portion of the buffer to the first semiconductor die after resetting the first semiconductor die; and
transfer the first unit of the primary parity from the second semiconductor die to the first portion of the buffer after transferring the recovery data from first portion of the buffer to the first semiconductor die.

12. A method comprising:
programming user data into non-volatile memory cells on a plurality of semiconductor dies;
accumulating primary bitwise XOR data for the user data in an XOR buffer in volatile memory;
transferring a final accumulation of a first unit of the primary bitwise XOR data from a first bin of the XOR buffer to a first semiconductor die of the plurality of semiconductor dies; and
accumulating secondary bitwise XOR data for the user data based on XOR data that is presently stored in the first bin and primary XOR data stored in bins of the XOR buffer other than the first bin.

13. The method of claim 12, wherein accumulating the secondary bitwise XOR data comprises:
calculating the secondary bitwise XOR data based on a bitwise XOR of the first unit of the primary XOR data and a second unit of the primary XOR data from a second bin of the XOR buffer, wherein the second unit of the primary XOR data represents a final accumulation for the second bin.

14. The method of claim 13, wherein accumulating the secondary bitwise XOR data further comprises:
calculating the secondary bitwise XOR data based on a bitwise XOR of a third unit of the primary XOR data from a third bin of the XOR buffer and content of the first bin after storing in the first bin the bitwise XOR of the first unit of the primary XOR data and the second unit of the primary XOR data, wherein the third unit of the primary XOR data represents a final accumulation for the third bin.

15. The method of claim 12, further comprising:
transferring the secondary bitwise XOR data to a first semiconductor die of the plurality of semiconductor dies after a final accumulation of the secondary bitwise XOR data has been stored in the first bin.

16. The method of claim 12, further comprising:
programming a final accumulation of the primary bitwise XOR data and a final accumulation of the secondary bitwise XOR data in parallel on a first semiconductor die of the plurality of semiconductor dies.

17. A non-volatile storage system, comprising:
a plurality of semiconductor dies, each semiconductor die comprising blocks of non-volatile memory cells;
volatile memory; and
a memory controller in communication with the volatile memory and the plurality of semiconductor dies, the memory controller comprising:
means for programming user data into open blocks on the semiconductor dies;
means for accumulating primary parity for the user data in parity bins of a buffer of the volatile memory; and
means for accumulating secondary parity for the user data in a first parity bin of the buffer based on present content of the first parity bin and primary parity for the user data stored in other parity bins of the buffer.

18. The non-volatile storage system of claim 17, wherein the means for accumulating secondary parity for the user data in a first parity bin of the buffer based on present content of the first parity bin and primary parity for the user data stored in other parity bins of the buffer is further for accumulating the secondary parity in the first parity bin after transfer of a final accumulation of the primary parity in the first parity bin to a semiconductor die has been initiated.

19. The non-volatile storage system of claim 17, wherein the means for accumulating secondary parity for the user data in the first parity bin of the buffer based on present content of the first parity bin and primary parity for the user data stored in other parity bins of the buffer is configured to:
successively calculate secondary bitwise XOR data for the user data based on present content of the first parity bin and primary XOR data that is presently stored in a parity bin of the buffer other than the first parity bin until a final calculation of the secondary bitwise XOR data is reached; and
successively replace the present content of the first parity bin with the most recent calculation of the secondary bitwise XOR data until a final accumulation of the secondary bitwise XOR data is reached.

20. The non-volatile storage system of claim 17, further comprising:
first data transfer means for transferring a final accumulation of the primary parity from the buffer to latches on a first set of the semiconductor dies;
second data transfer means for transferring a final accumulation of the secondary parity from the buffer to latches on a second set of the semiconductor dies; and
program means for programming the primary parity and the secondary parity in parallel on the first set and the second set of the semiconductor dies.

* * * * *